US012517208B2

(12) United States Patent
Duan et al.

(10) Patent No.: US 12,517,208 B2
(45) Date of Patent: Jan. 6, 2026

(54) ADAPTION OF REFERENCE SIGNAL FOR POSITIONING BASED ON USER EQUIPMENT (UE) MOBILITY

(71) Applicant: QUALCOMM Incorporated, San Diego, CA (US)

(72) Inventors: Weimin Duan, San Diego, CA (US); Alexandros Manolakos, Escondido, CA (US); Yi Huang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 18/553,989

(22) PCT Filed: Apr. 27, 2022

(86) PCT No.: PCT/US2022/071957
§ 371 (c)(1),
(2) Date: Oct. 4, 2023

(87) PCT Pub. No.: WO2022/266562
PCT Pub. Date: Dec. 22, 2022

(65) Prior Publication Data
US 2024/0183927 A1    Jun. 6, 2024

(30) Foreign Application Priority Data
Jun. 16, 2021 (GR) .............................. 20210100395

(51) Int. Cl.
*G01S 5/02* (2010.01)
*H04L 5/00* (2006.01)
(52) U.S. Cl.
CPC .......... *G01S 5/0236* (2013.01); *H04L 5/0051* (2013.01)

(58) Field of Classification Search
CPC ... H04L 5/0051; H04L 5/0053; H04L 5/0048; H04L 5/001; H04L 5/0094;
(Continued)

(56) References Cited

U.S. PATENT DOCUMENTS

| 2020/0196298 A1 | 6/2020 | Edge et al. |
| 2021/0058212 A1 | 2/2021 | Si et al. |

(Continued)

FOREIGN PATENT DOCUMENTS

| WO | WO-2018175813 A1 * | 9/2018 | ........... H04L 5/1469 |
| WO | 2021088970 A1 | 5/2021 | |
| WO | 2021092072 A1 | 5/2021 | |

OTHER PUBLICATIONS

International Search Report and Written Opinion—PCT/US2022/071957—ISA/EPO—Aug. 26, 2022.
(Continued)

*Primary Examiner* — Olumide Ajibade Akonai
(74) *Attorney, Agent, or Firm* — Thien T. Nguyen

(57) ABSTRACT

Techniques are disclosed for using reference signals that enable accurate measurements of a moving UE. To this end, techniques can include a location server obtaining an indication that the velocity of the UE exceeds a threshold and, in response, configuring the UE to measure a reference signal using a selected Tracking Reference Signal (TRS) as a Quasi-Collocation (QCL) reference. In particular, a periodic TRS (P-TRS) or an aperiodic TRS (AP-TRS) can be used as the QCL reference. A reference signal may be configured based on an existing TRS configuration, or a TRS may be configured based on a reference signal configuration. According to some embodiments, a UE may provide velocity information to the location server. Additionally or alternatively, a measurement period for the reference signal may be based on a velocity of the UE.

40 Claims, 14 Drawing Sheets

(58) Field of Classification Search
CPC ............... H04W 72/232; H04W 72/23; H04W 72/0446; H04W 64/00; H04W 72/12; H04W 48/12; H04W 24/08; H04W 72/51; G01S 5/0236; G01S 1/0428; G01S 5/0205; G01S 19/52
See application file for complete search history.

(56) References Cited

U.S. PATENT DOCUMENTS

2022/0116256 A1* 4/2022 Shahmohammadian .................... H04L 5/0048
2022/0376855 A1* 11/2022 Zhang ................... H04L 5/0051

OTHER PUBLICATIONS

3GPP: "3rd Generation Partnership Project, Technical Specification Group Radio Access Network, NG Radio Access Network (NG-RAN), Stage 2 functional specification of User Equipment (UE) positioning in NG-RAN (Release 16)", 3GPP TS 38.305 V16.4.0, Mar. 2021, pp. 1-119, Table 8.5.2.2-1 and Chapter 4.1.
Qualcomm Incorporated: "On-Demand DL-PRS", R2-2106084, 3GPP TSG-RAN WG2 Meeting #114-e, Electronic, May 19-27, 2021, pp. 1-10., Table 7.x.5-1, Chapters 2, 7.x.2, 7.x.3, 7.x.4.1, 7.x.4.2, 7.x.4.3 and 7.x.5.
Taiwan Search Report—TW111116211—TIPO—Oct. 28, 2025.

\* cited by examiner

ADAPTION OF REFERENCE SIGNAL FOR POSITIONING BASED ON USER EQUIPMENT (UE) MOBILITY

RELATED APPLICATIONS

This application claims the benefit and is a National Phase entry of International Application No. PCT/US2022/071957, filed Apr. 27, 2022, entitled "ADAPTION OF REFERENCE SIGNAL FOR POSITIONING BASED ON USER EQUIPMENT (UE) MOBILITY" which claims the benefit of Greek application Ser. No. 20210100395, filed Jun. 16, 2021, entitled "ADAPTION OF REFERENCE SIGNAL FOR POSITIONING BASED ON USER EQUIPMENT (UE) MOBILITY", both of which are assigned to the assignee hereof, and incorporated herein in their entirety by reference.

BACKGROUND

1. Field of Disclosure

The present disclosure relates generally to the field of wireless communications, and more specifically to determining the location of a User Equipment (UE) using radio frequency (RF) signals.

2. Description of Related Art

In a wireless communication network, such as a mobile/cellular broadband network, various positioning techniques can be used to determine the location of a mobile electronic device (referred to herein as a UE). These positioning techniques often involve the UE transmitting and/or receiving reference RF signals for positioning, or simply "reference signals," to/from one or more Transmission Reception Points (TRPs) of the wireless communication network. These reference signals typically have certain qualities that allow for accurate measurements to be taken for positioning purposes. These measurements, together with information regarding the location of the one or more TRPs, can be used to determine a location of the UE. Often times, however, these reference signals are unable to allow for accurate measurements of a UE that is in motion.

BRIEF SUMMARY

The present disclosure describes embodiments that employ techniques for using reference signals that enable accurate measurements of a moving UE. To this end, techniques can include a location server obtaining an indication that the velocity of the UE exceeds a threshold and, in response, configuring the UE to measure a reference signal using a selected Tracking Reference Signal (TRS) as a Quasi-Collocation (QCL) reference. In particular, a periodic TRS (P-TRS) or an aperiodic TRS (AP-TRS) can be used as the QCL reference. A reference signal may be configured based on an existing TRS configuration, or a TRS may be configured based on a reference signal configuration. According to some embodiments, a UE may provide velocity information to the location server. Additionally or alternatively, a measurement period for the reference signal may be based on a velocity of the UE.

An example method of coordinating transmission of a downlink Positioning Reference Signal (DL-PRS) resource for positioning a User Equipment (UE) in a wireless communication network, according to this disclosure, comprises obtaining, at a location server, an indication that a velocity of the UE exceeds a threshold. The method also comprises responsive to obtaining the indication, determining, at the location server, a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS. The method also comprises sending the PRS configuration from the location server to the UE.

An example location server for coordinating transmission of a downlink Positioning Reference Signal (DL-PRS) resource for positioning a User Equipment (UE) in a wireless communication network, according to this disclosure, comprises a transceiver, a memory, one or more processors communicatively coupled with the transceiver and the memory, wherein the one or more processors are configured to obtain an indication that a velocity of the UE exceeds a threshold. The one or more processing units are further configured to, responsive to obtaining the indication, determine a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS. The one or more processing units are further configured to send, via the transceiver, the PRS configuration to the UE.

An example apparatus for coordinating transmission of a downlink Positioning Reference Signal (DL-PRS) resource for positioning a User Equipment (UE) in a wireless communication network, according to this disclosure, comprises means for obtaining an indication that a velocity of the UE exceeds a threshold. The apparatus further comprises means for determining, responsive to obtaining the indication, a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS. The apparatus further comprises means for sending the PRS configuration from a location server to the UE.

According to this disclosure, an example non-transitory computer-readable medium stores instructions for coordinating transmission of a downlink Positioning Reference Signal (DL-PRS) resource for positioning a User Equipment (UE) in a wireless communication network, the instructions comprising code for obtaining an indication that a velocity of the UE exceeds a threshold. The instructions further comprise code for, responsive to obtaining the indication, determining a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS. The instructions further comprise code for sending the PRS configuration from a location server to the UE.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
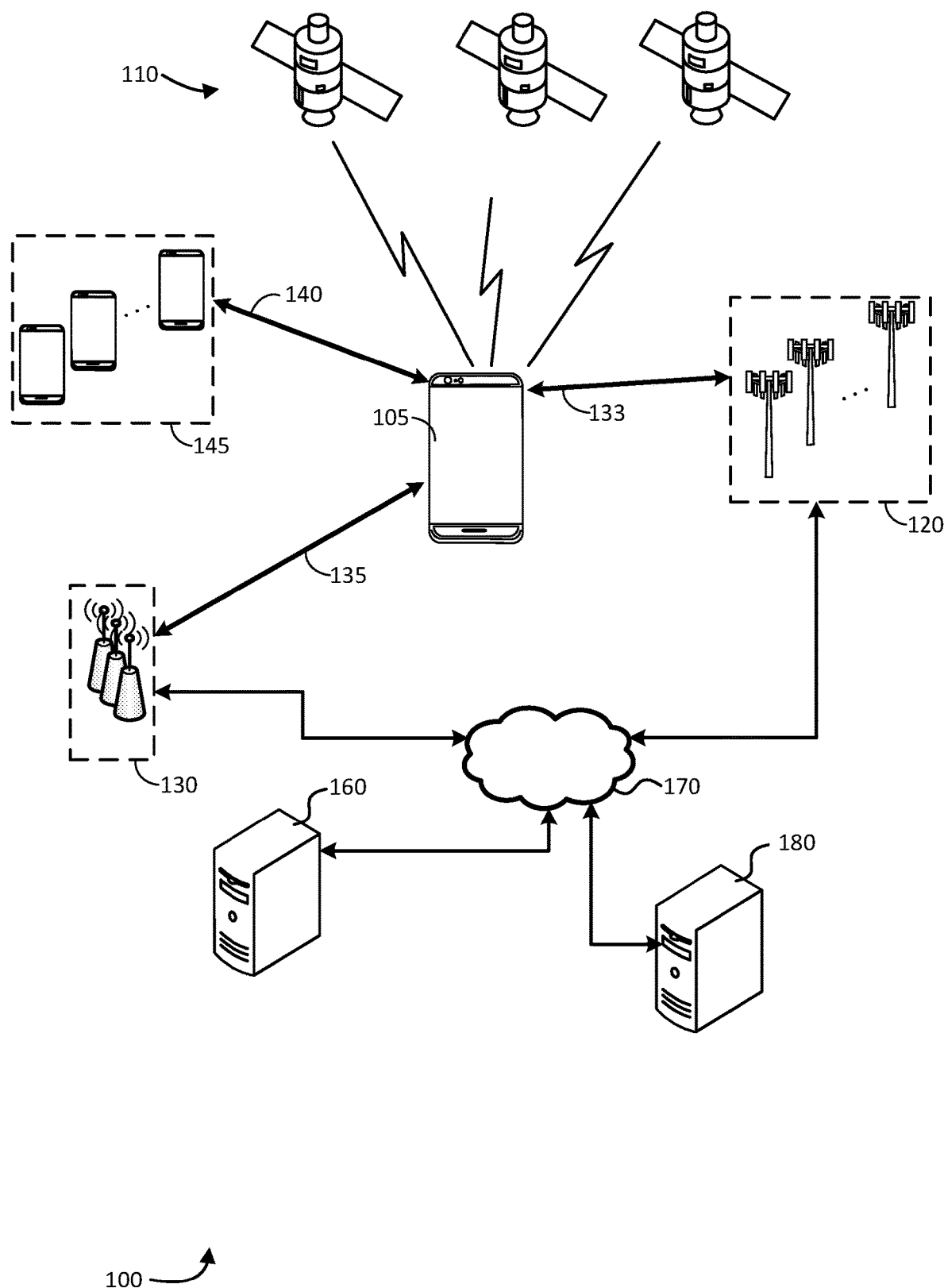
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IOT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) or Sounding Reference Signal (SRS) as defined in relevant wireless standards.

As previously noted, RF reference signals may be used to determine the position or location of a mobile device (e.g., UE) in a wireless communication network. However, as described in further detail below, RF reference signals, such as SRS and PRS, often may not be suitable for high-speed UE positioning. (As used herein, "high-speed" UE positioning may comprise positioning of a UE traveling at approximately highway speeds (e.g., 65 mph) or greater.) For example, a single PRS or SRS resource may not be able to provide Doppler estimation for the UE. Further, simple combining over multiple PRS or SRS instances may provide limited gain due to channel aging.

To address these and other issues, embodiments described herein employ techniques for using reference signals that enable accurate measurements of a moving UE by leveraging a Tracking Reference Signal (TRS) as a Quasi-Collocation (QCL) reference for a reference signal.

FIG. 1 is a simplified illustration of a positioning system 100 in which a UE 105, location server 160, and/or other components of the positioning system 100 can use the techniques provided herein for adapting reference signals for positioning based on UE mobility, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 320; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 320, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 320 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 320 and access points (APs) 130 are communicatively coupled to the network 170. In some embodiments, the base station 320s may be owned, maintained, and/or operated by a cellular network provider, and may employ any of a variety of wireless technologies, as described herein below. Depending on the technology of the network 170, a base station 320 may comprise a node B, an Evolved Node B (eNodeB or eNB), a base transceiver station (BTS), a radio base station (RBS), an NR NodeB (gNB), a Next Generation eNB (ng-eNB), or the like. A base station 320 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 320 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 320. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 320 may comprise multiple TRPs—e.g. with each TRP associated with a different antenna or a different antenna array for the base station 320. Physical transmission points may comprise an array of antennas of a base station 320 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 320 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IOT), Enhanced Mobile Broadband (cMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 320). The estimated location of the UE 105 can be estimated geometrically (e.g., using multiangulation and/or multilateration), based on the distance and/or angle measurements, along with known position of the one or more components.

Although terrestrial components such as APs 130 and base stations 320 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When one or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
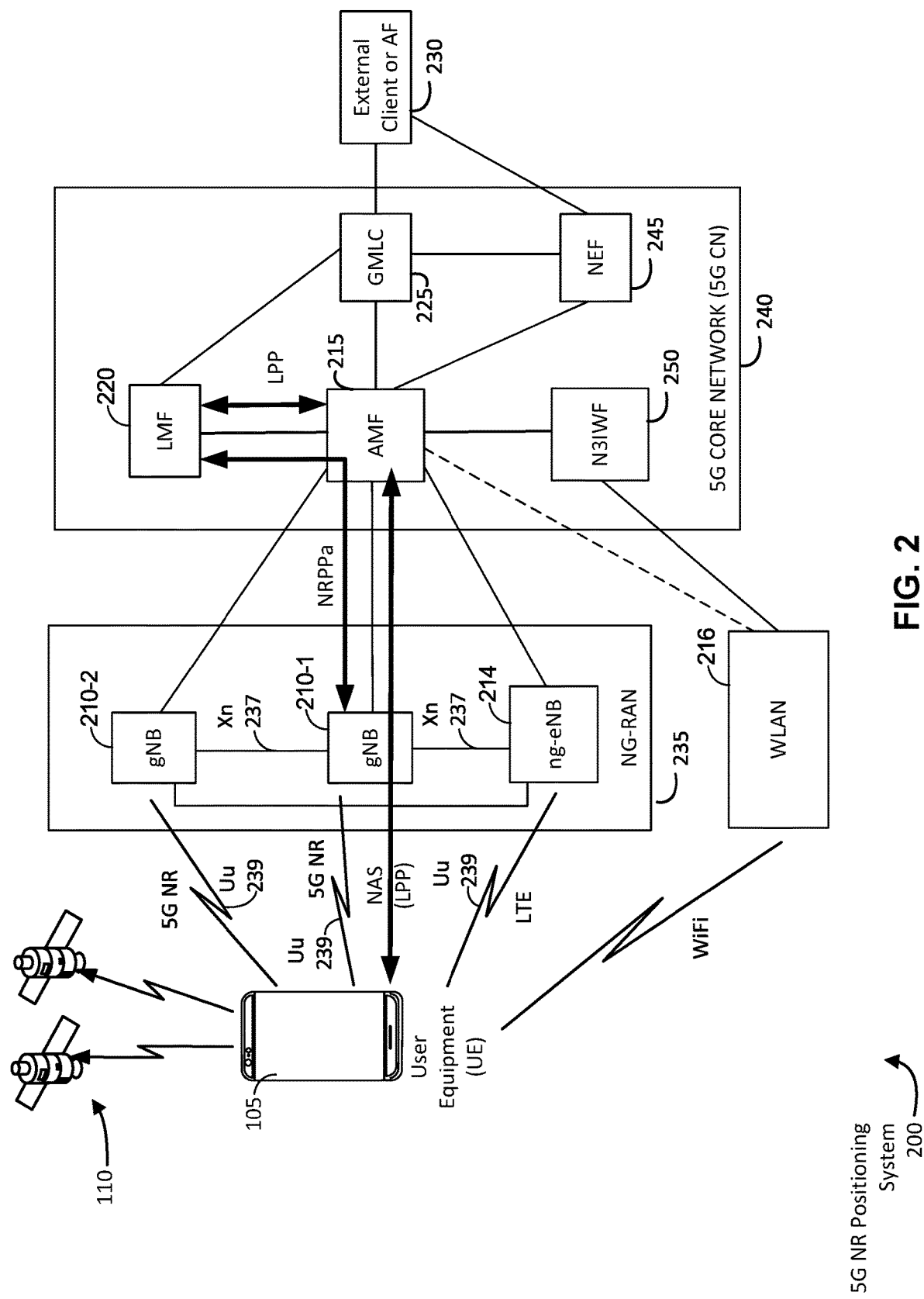
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 320 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IOT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 320 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-cNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-cNB, 214. Ng-cNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-cNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an CNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-cNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-cNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-cNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
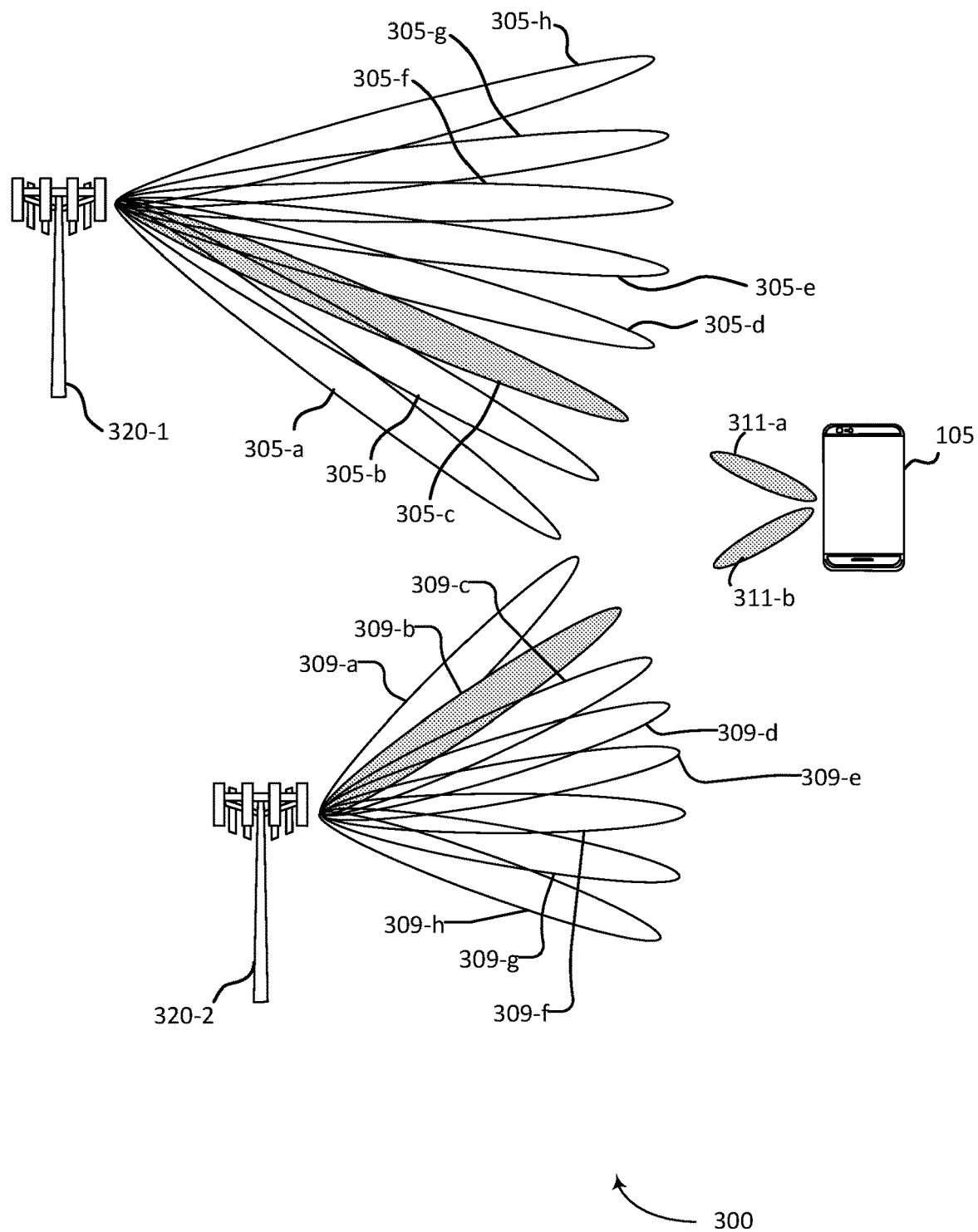
FIG. 3 is a diagram illustrating an example of beamforming that can be used by difference devices, according to some embodiments.

FIG. 3 is a diagram illustrating a simplified environment 300 including two TRPs 320-1 and 320-2 (which may correspond to base stations 120 of FIG. 1 and/or gNBs 210 and/or ng-cNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each of the directional beam may have a beam width centered in a different direction, enabling different beams of a TRP 320 to correspond with different areas within a coverage area for the TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams the TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a TRP 320 may use beam sweeping. Beam sweeping is a process in which the TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-a, 305-b, 305-c, 305-d, 305-c, 305-f, 305-g, and 305-h, and the base station 320-2 produces a set of RF reference signals that includes Tx beams 309-a, 309-b, 309-c, 309-d, 309-c, 309-f, 309-g, and 309-h. As noted, because UE 320 may also include an antenna array, it can receive RF reference signals transmitted by base stations 320-1 and 320-2 using beamforming to form respective receive beams (Rx beams) 311-a and 311-b. Beamforming in this manner (by base stations 320 and optionally by UEs 105) can be used to make communications more efficient. They can also be used for other purposes, including taking measurements for position determination (e.g., AoD and AoA measurements).

Figure 4:
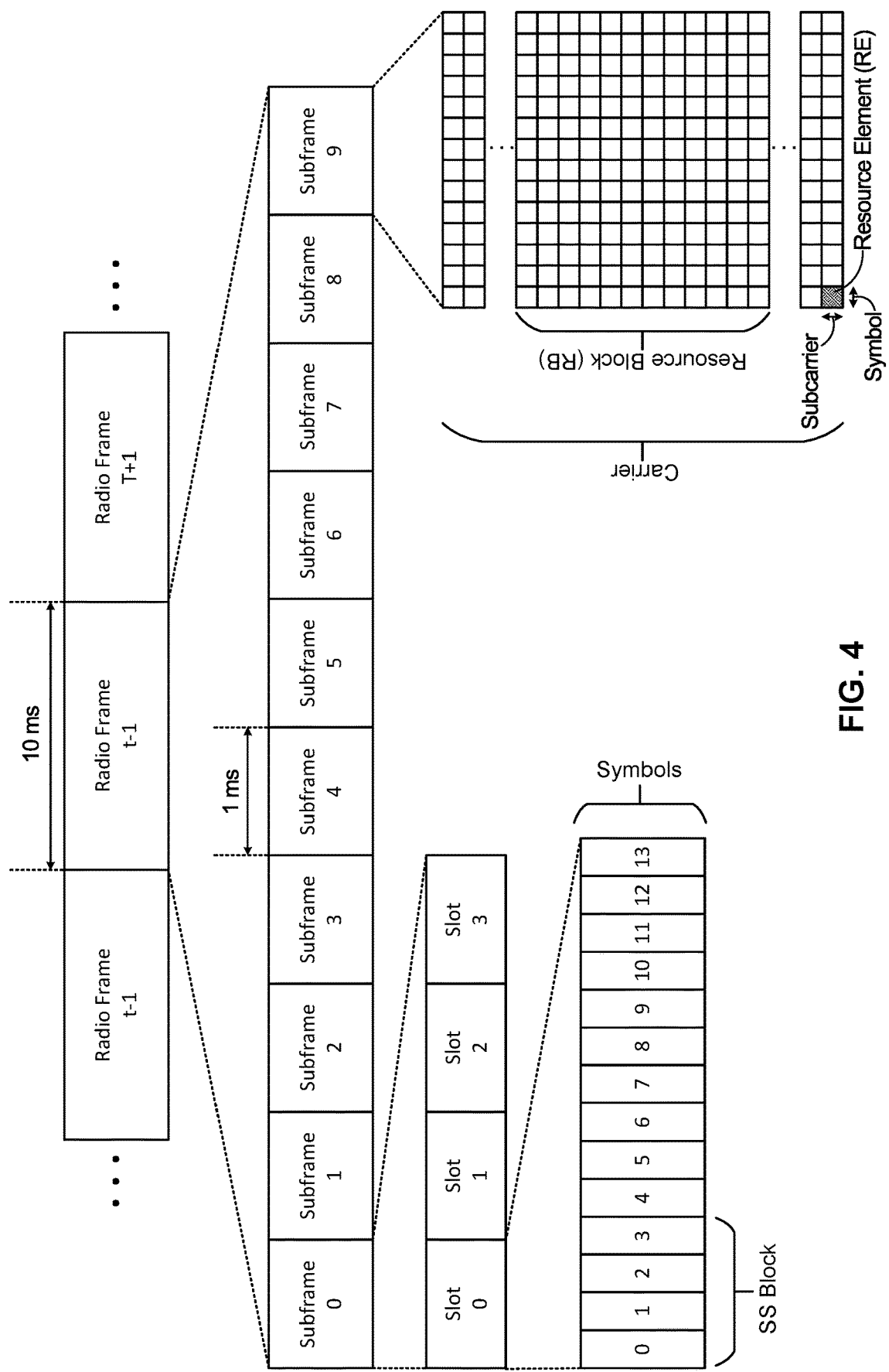
FIG. 4 is a diagram showing an example of a frame structure for NR and associated terminology.

FIG. 4 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 5:
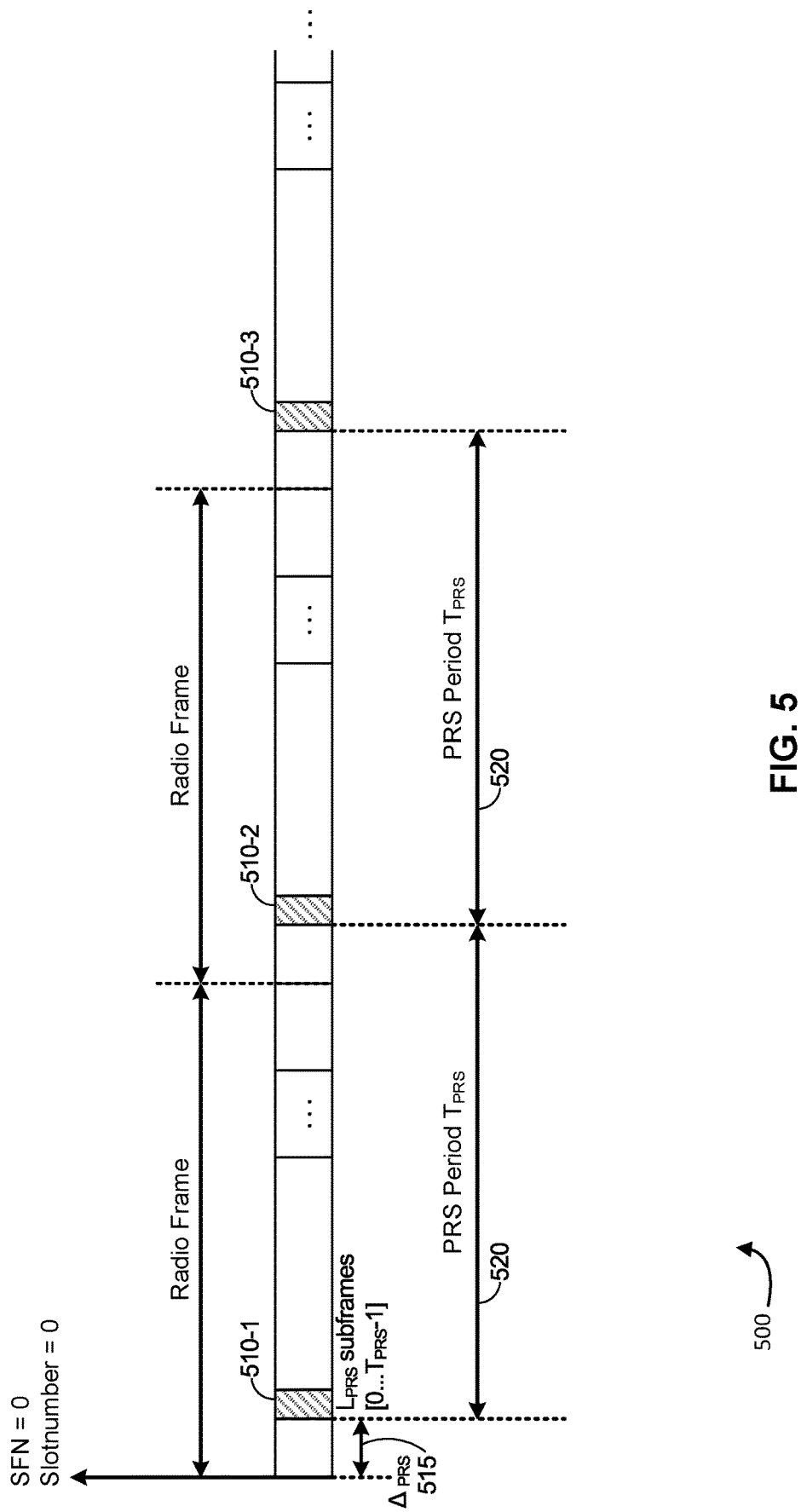
FIG. 5 is a diagram showing an example of a radio frame sequence with Positioning Reference Signal (PRS) positioning occasions.

FIG. 5 is a diagram showing an example of a radio frame sequence 500 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance", a "positioning occasion," "a positioning instance," or simply an "occasion" or "instance." Subframe sequence 500 may be applicable to broadcast of PRS signals (DL-PRS signals) from base stations 320 in positioning system 100. The radio frame sequence 500 may be used in 5G NR (e.g., in 5G NR positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

FIG. 5 shows how PRS positioning occasions 510-1, 510-2, and 510-3 (collectively and generically referred to herein as positioning occasions 510) are determined by a System Frame Number (SFN), a cell-specific subframe offset ($\Delta_{PRS}$) 515, a length or span of LPRs subframes, and the PRS Periodicity ($T_{PRS}$) 520. The cell-specific PRS subframe configuration may be defined by a "PRS Configuration Index,"/PRS, included in assistance data (e.g., TDOA assistance data), which may be defined by governing 3GPP standards. The cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., base stations 320) after appropriate configuration (e.g., by an Operations and Maintenance (O&M) server). A PRS may be transmitted in special positioning subframes or slots that are grouped into positioning occasions 510. For example, a PRS positioning occasion 510-1 can comprise a number $N_{PRS}$ of consecutive positioning subframes where the number $N_{PRS}$ may be between 1 and 160 (e.g., may include the values 1, 2, 4 and 6 as well as other values). PRS occasions 510 may be grouped into one or more PRS occasion groups. As noted, PRS positioning occasions 510 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 520 and cell-specific subframe offset ($\Delta_{PRS}$) 515 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 515) relative to other cells in the network that use a different frequency. In SFN-synchronous networks all wireless nodes (e.g., base stations 320) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 510 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Figure 6:
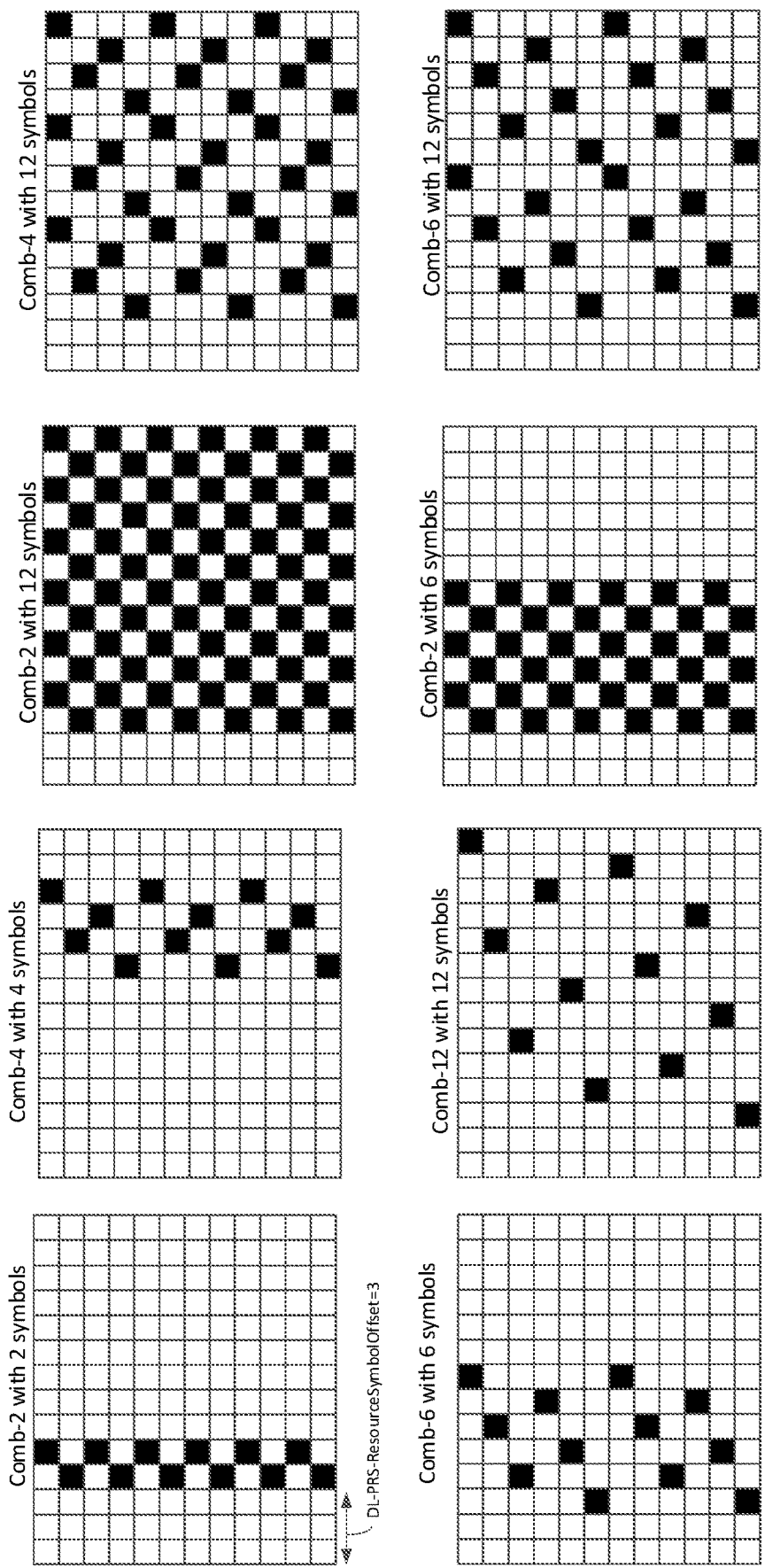
FIG. 6 is a diagram showing example comb structures, illustrating how RF signals may utilize different sets of resource elements, according to some embodiments.

With reference to the frame structure in FIG. 4, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 6.

A "PRS resource set" comprises a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

As previously noted, reference signals such as DL-PRS and SRS often may not allow for accurate high-speed UE positioning. Oftentimes, for example, a DL-PRS may use only a comb-2 signal structure that is two symbols in length, and an SRS may even have a comb-1 signal structure that is one symbol in length. These signal lengths often may be insufficient for capturing Doppler, and, as previously noted, combining multiple PRS/SRS resources over time may be limited due to channel aging. Without Doppler estimation for a moving UE the accuracy of the UE position estimate may suffer, whereas with a Doppler estimation the position estimate of the UE may be more accurate. For example, a ToA estimation using a search in both delay and Doppler domains can outperform a ToA estimation in only the delay domain.

Embodiments herein provide for the use of reference signals (e.g., DL-PRS and/or SRS) that allow for Doppler estimation, potentially improving the accuracy of a UE position estimate in high-speed UE positioning. As noted, such functionality is enabled through the use of a TRS as a QCL reference. Additional details are provided below with regard to FIG. 7.

Figure 7:
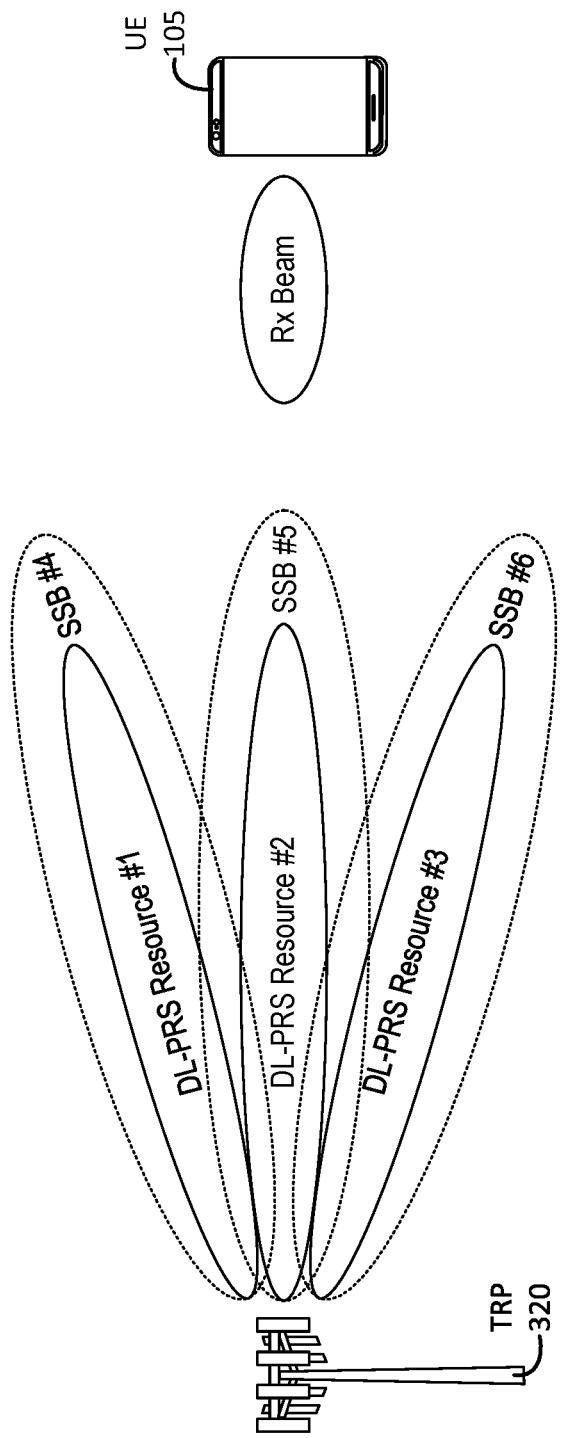
FIG. 7 is a diagram illustrating how a Quasi-Collocation (QCL) reference can be used for downlink (DL) PRS (DL-PRS) resources.

FIG. 7 is a diagram illustrating how a QCL reference can be used for DL-PRS resources. In NR, a QCL relationship between two signals (which may be referred to as being "QCLed") is a relationship that defines a set of radio channel properties shared between the two signals. Different types of QCL are labeled A, B, C, and D (which may be referred to as "TypeA," "TypeB," etc.), and each type conveys a different set of properties. QCL-TypeD, for example, defines spatial receiver parameters. QCL-TypeC defines parameters relating to Doppler shift and average delay. By designating a first signal as a QCL reference (or QCL "source"), a network can efficiently convey properties regarding a second signal (QCLed with the first signal) to a UE. This enables the UE to ensure proper configuration for reception of the second signal.

For example, in FIG. 7, different DL-PRS resources are QCLed with respective SSB resources. Specifically, DL-PRS resource #1 is QCLed with SSB #4, DL-PRS resource #2 is QCLed with SSB #5, DL-PRS resource #3 is QCLed with SSB #6. To help ensure proper configuration of the UE 105 for receiving network DL-PRS resources #1-3, the network (e.g., a location server (not shown) or TRP 320) can identify the corresponding SSB for each DL-PRS resource with which the respective DL-PRS resource is QCLed. This information can be provided to the UE 105 by the network in a PRS configuration, which can provide additional information regarding each DL-PRS (e.g., the previously-described PRS parameters, such as periodicity, frequency, etc.).

Depending on desired functionality, different QCL types can be used to support a DL-PRS resource. For example, an SSB from a serving or neighboring TRP may be used as a QCL-TypeC reference for a DL-PRS resource. Additionally or alternatively, a DL-PRS resource or SSB from a serving or neighboring TRP may be used as a QCL-TypeD reference for a DL-PRS resource. It can be noted, however, that a QCL relation between two DL-PRS resources may only be provided for DL-PRS resources of the same TRP.

Traditionally, however, no QCL relationship has been defined for DL-PRS that can ensure proper configuration of a UE to make accurate ToA measurements/Doppler estimation in high-speed scenarios. As noted, embodiments herein may address these shortcomings by using TRS as a QCL reference for DL-PRS.

TRS is a DL transmission by a TRP that allows a UE to track time and frequency variations with a higher resolution than synchronization signals, which can ensure good data transfer performance in both UL and DL directions. As such, a TRS can be used to accurately estimate Doppler.

TRS may be periodic (referred to as P-TRS) or aperiodic (A-TRS). A P-TRS may comprise a Channel State Information Reference Signal (CSIRS) resource set for tracking, which can be configured in a Radio Resource Control (RRC) message to the UE with a semi-statically configured Transmission Configuration Indicator (TCI) state. An SSB can be used as a QCL-TypeC and QCL-TypeD reference of a P-TRS in some instances. Alternatively, an SSB may be used as a QCL-TypeC reference and a CSIRS beam management (CSIRS-BM) resource can be used as a QCL-TypeD reference for a P-TRS.

An AP-TRS may comprise a Downlink Control Information (DCI)-triggered resource set that may also be configured in an RRC message with a configured TCI state. An AP-TRS is associated with a P-TRS and may experience a very similar channel. As such, the P-TRS can be used as a QCL-TypeA and/or QCL-TypeD reference for the AP-TRS.

Embodiments can leverage the effectiveness of TRS in Doppler estimation by using TRS as a QCL reference for DL-PRS. For example, according to some embodiments, a P-TRS from a serving or neighboring TRP may be used as a QCL-TypeC reference for a DL-PRS transmitted by the TRP. This means, in some instances, the P-TRS may be used indirectly as a QCL reference, where an SSB from a serving or neighboring TRP is used as a QCL-TypeC reference for a DL-PRS where the SSB is also used as a QCL-TypeC reference for the P-TRS. Because P-TRS beams might be wider beams (spatial, doppler, delay profile mismatch) compared with beams used for DL-PRS, there may be limitations to using P-TRS as a QCL reference in high mobility situations. Further, P-TRS may be costly with regards to overhead in FR2. Even so, P-TRS may still be used as a QCL reference according to some embodiments.

According to some embodiments, an AP-TRS from a serving or neighboring TRP can be used as a QCL-TypeC reference for DL-PRS transmitted by the TRP. As compared with P-TRS, AP-TRS may provide a better-matched QCL reference for DL-PRS, especially in the scenarios of fast beam switch or high mobility.

When using a TRS (P-TRS or AP-TRS) as a QCL reference, embodiments may take into account various considerations. For example, the RB allocation of the TRS across frequency (which is controlled by a TRP) may need to overlap with at least some of the frequency used for the DL-PRS, to help ensure the signals experience approximately the same channel. Further, a measurement gap (MG) used to process the DL-PRS may, in some instances, prevent measurement and processing of the TRS. In such instances, PRS processing without an MG may be specified to allow the UE to measure the intersection of the configured DL-PRS and the active BWP (in which the TRS may be received). Further, according to some embodiments, a location server may provide the UE with time-frequency location for TRS transmissions on neighboring TRPs (e.g., via LPP). That is, because neighboring TRP cannot directly configure a UE with this information in the manner a serving TRP can, a location server can be used to relay this information regarding neighboring TRPs to a UE, thereby enabling TRS transmissions by neighboring TRPs to more easily be used as QCL references for DL-PRS on the respective neighboring TRPs.

According to some embodiments, velocity information from a UE can be used to trigger the functionality described above. For example, a UE can provide the location server and/or a TRP with information regarding the UE's velocity, which, if above a certain threshold, can trigger the usage of TRS as a QCL reference for DL-PRS used for positioning the UE. Additionally or alternatively, velocity information may be used to help ensure TRPs are properly configured to receive UL signals transmitted by the UE for positioning. More specifically, to enable the joint delay/Doppler search in a TRP's reception and processing of a UL signal (e.g., SRS), a UE, according to some embodiments, may provide velocity information to a location server (e.g., via a serving TRP), and the location server can then distribute this information in a velocity report to all TRPs used for positioning the UE. Thus, velocity information provided by the UE can be used as described herein to help optimize the reception and processing of either or both (i) DL reference signals (e.g., DL-PRS) received by the UE, and (ii) UL reference signals (e.g., SRS) received by one or more TRPs.

The content of the velocity report sent from the location server to the TRPs may vary, depending on desired functionality. In addition to the velocity of the UE, for example, the report may comprise an identifier of the UE (e.g., the UE ID), a direction of the velocity (e.g., in addition to speed), and/or a timestamp indicative of when the velocity of the UE was measured or estimated. According to some embodiments, the UE indicate one or more sources of the velocity measurement or estimation (for example, NR, GNSS, and/or sensor). Additionally or alternatively, and uncertainty of the reported velocity may also be included. For example, the absolute velocity may be used to find an initial Doppler search point, and the uncertainty of the velocity could help TRPs to find a suitable Doppler shift search window.

As for the estimation of the velocity of the UE, embodiments may perform the estimation in any of a variety of ways, depending on desired functionality, available data, and/or other factors. For example, according to some embodiments, Doppler estimation may be made based on TRS. Additionally or alternatively, velocity may be based on one or more additional components of the UE, such as GNSS and/or or more sensors. The capabilities of the UE may vary, depending on the UE type. For example, for a UE comprising a vehicle, the vehicle's wheel speed sensor and IMU may provide accurate speed and direction estimation.

As noted, the velocity of the UE can impact the reception and processing of both UL signals transmitted by the UE and DL signals received at the UE. With regard to DL-PRS processing capabilities at the UE, the search space used by the UE for receiving the DL-PRS may comprise a search window of P milliseconds (ms) that includes a duration of K ms during which DL-PRS symbols are transmitted. Traditionally, the UE may buffer symbols of the search window based on the slot(s) during which DL-PRS resources are transmitted by one or more TRP(s) or the symbol(s) during which DL-PRS from the one or more TRP(s) are expected to be received at the UE. However, according to some embodiments, this window (the PRS measurement period) and/or the periodicity of the DL-PRS resources may be based on the UEs mobility.

For example, according to some embodiments, a TRP may be able to dynamically configure the PRS period ($T_{PRS}$ of FIG. 5) based on the UE's mobility. For example, a TRP configure PRS period to be relatively short based on high mobility to help reduce the effects of channel aging. Longer PRS periods could be used for slower UEs.

Additionally or alternatively, the PRS measurement window (e.g., search window P, as previously described) may be dynamically configured based on a velocity of the UE. Depending on desired functionality, this can be done by the UE or the network. For example, according to some embodiments, the UE may be able to dynamically determine a preferred PRS measurement period, P, based on its PRS measurement quality as part of its PRS processing capability. The UE could then report this to the network (e.g., a TRP or location server), and the network could adapt its PRS configuration (at least the PRS period) based on the reported suggested P. Again, the higher the mobility, the smaller the measurement period P may be. Additionally or alternatively, the network (e.g., a location server or TRP) may dynamically indicate the UE a suggested P for PRS processing based on an indication of the UE's velocity by the UE. In such embodiments, the UE may decide the measurement period P, which the UE may provide to the network and a UE capability report. This also may be based on the UE's hardware capability. For its part, the network could use the suggested measurement period when determining the largest value of P to adopt.

Figure 8:
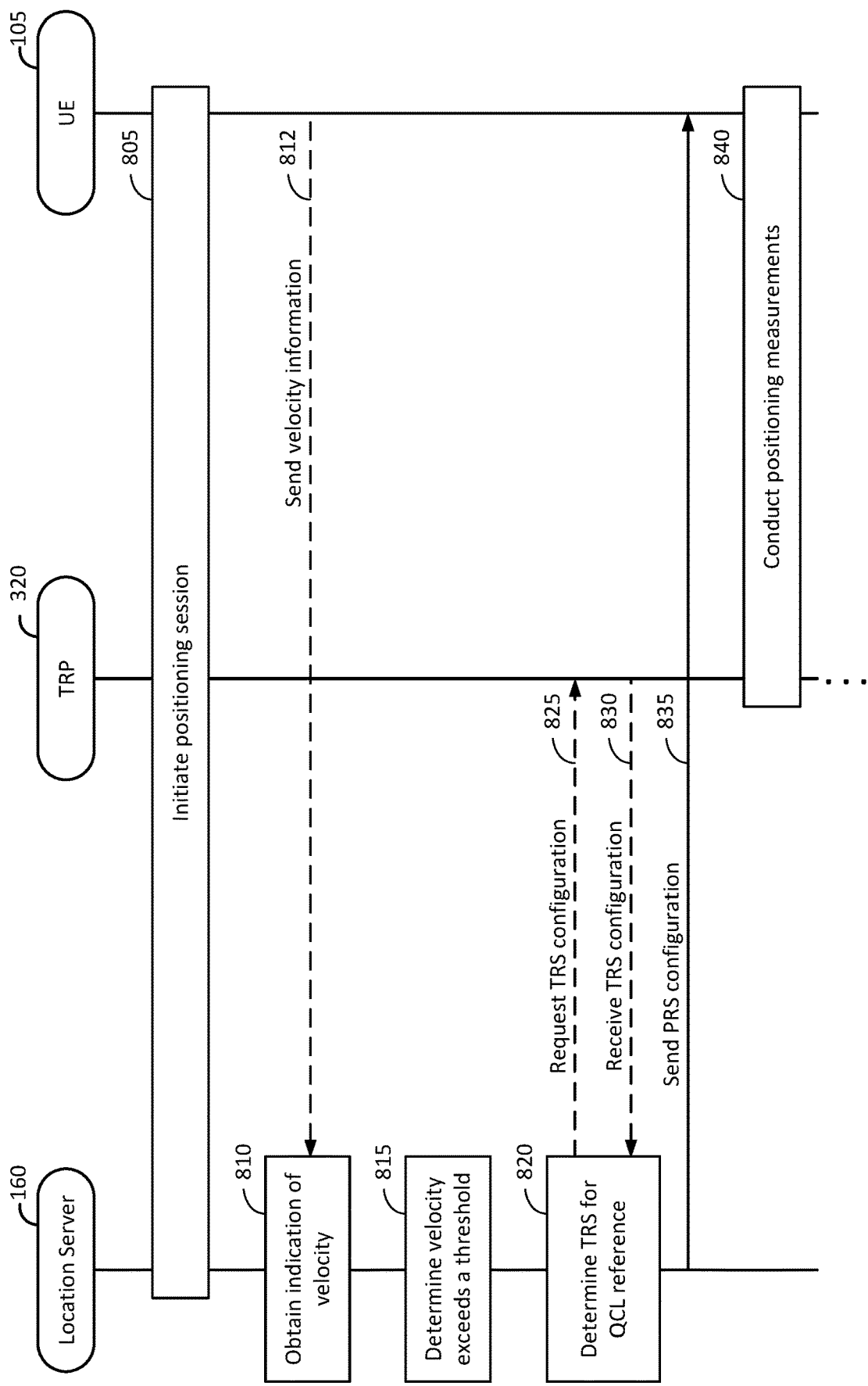
FIGS. 8-10 are diagrams illustrating methods of coordinating transmission of a DL-PRS resource, according some embodiments.
Figure 9:
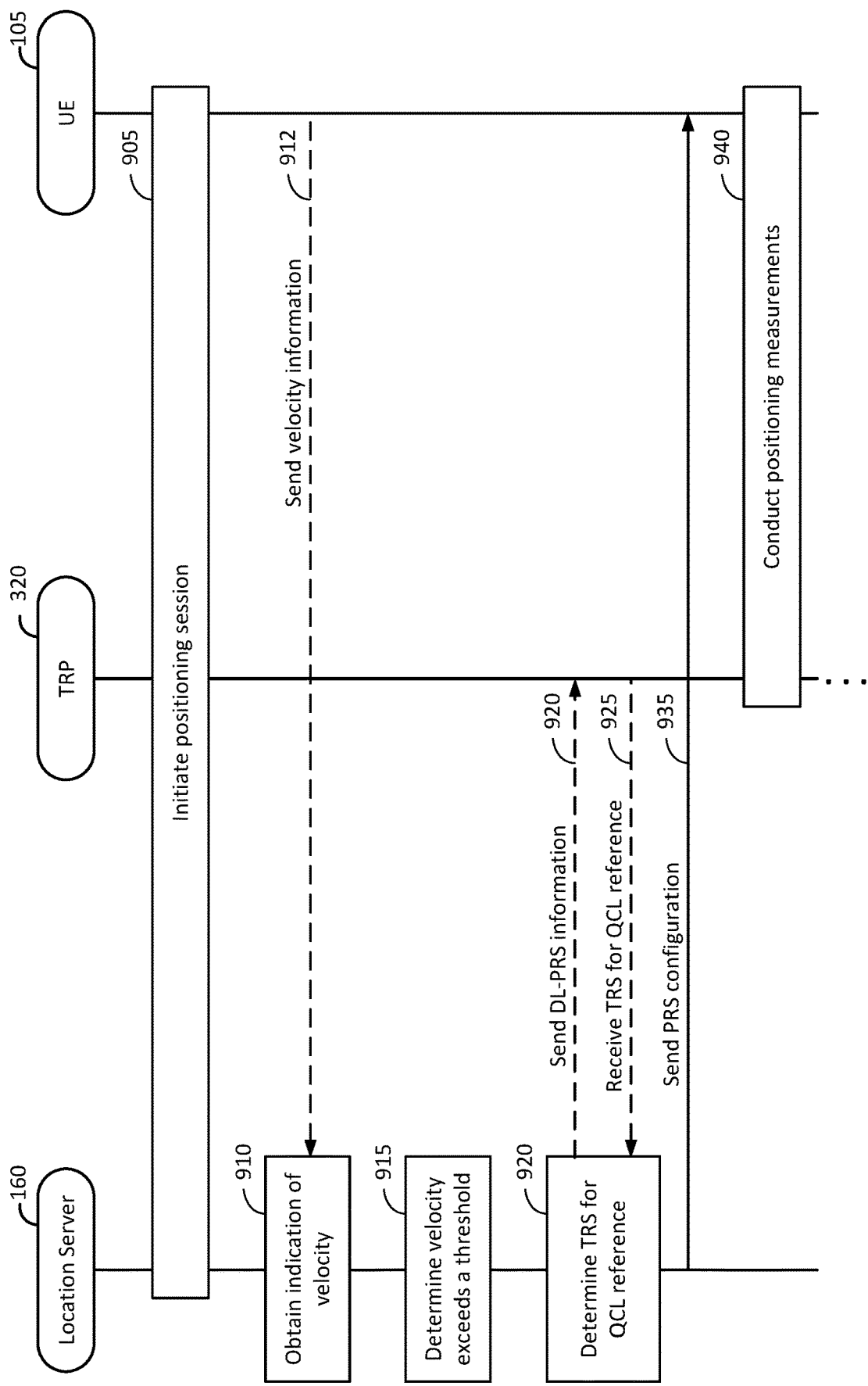
Figure 10:
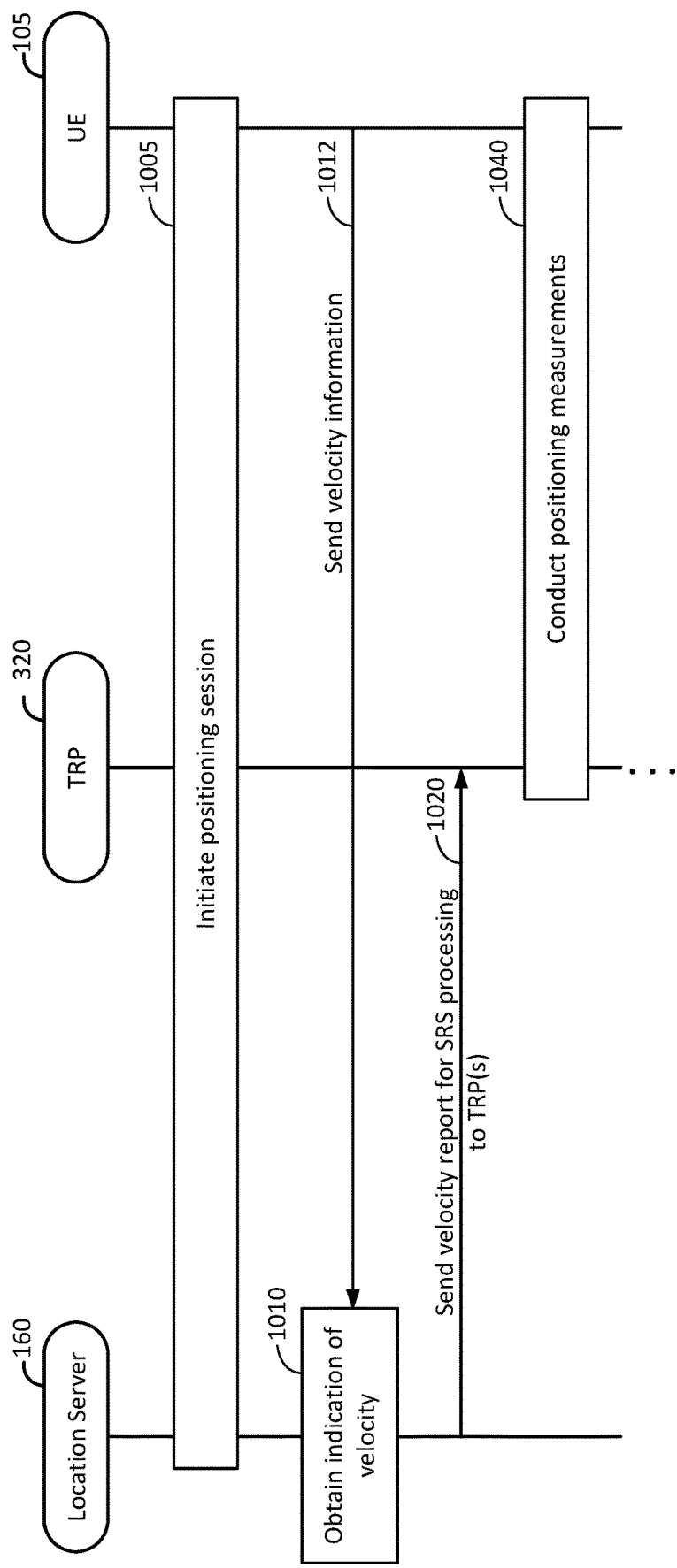

FIGS. 8-10 are diagrams provided to help illustrate the interaction between the UE 105, location server 160, and TRP of 320 to implement some of the functionality of the above-described embodiments.

FIG. 8 is a diagram illustrating a method of coordinating transmission of a DL-PRS resource, according to an embodiment. Arrows between devices illustrate communication between the devices. It can be noted, however, that communication may be indirect, and thus, may pass through and/or be relayed by one or more additional devices. Communications between the location server 160 and UE 105 may be conducted using LPP and/or similar means, which may be relayed through a serving TRP of the UE 105. The TRP 320 illustrated in FIG. 8 may comprise a serving TRP of the UE or a neighboring TRP. Communications between the location server 160 and TRP 320 may be conducted via NRPPa and/or similar means. Communications between the TRP 320 and UE 105 may be made via wireless RF signals and may comprise RRC and/or similar means. According to some embodiments, additional TRPs may be used in the positioning of the UE 105.

The method may begin with the operation at block 805, in which the UE 105 and location server 160 initiate a positioning session. As previously noted, the positioning session may comprise an LPP positioning session. Further, the location server 160 or the UE 105 may initiate the positioning session, depending on whether the positioning session is UE-based or UE-assisted, for example. The initiation of the positioning session may include an exchange of capabilities and/or other information that can be used by the location server 160 and/or UE 105 in coordinating and measuring DL-PRS resources transmitted by the TRP 320.

At block 810, the location server 160 may obtain an indication of the velocity of the UE 105. As noted, this indication may be received in a message from the UE 105, as indicated at arrow 812. As also previously noted, this velocity information may comprise an estimation or measurement based on information from GNSS, sensors, and/or other sources. Additionally or alternatively, the location server 160 may obtain an indication of the velocity of the UE the other sources (e.g., other location systems, historical data regarding the UE, data (e.g. crowdsourced data) regarding the current or historical velocity of other UEs, etc.).

At block 815, the location server may determine, based on the indication of the velocity received at block 810, that the velocity of the UE 105 exceeds a threshold. This threshold may vary, depending on the frequency used by the DL-PRS (e.g., based on Doppler spread, etc.). Additionally or alternatively, this threshold may be based on an accuracy requirement for the UE positioning, which may be conveyed by the UE (e.g., during the initiation of the positioning session), an entity requesting the positioning of the UE 105, or the like. With the velocity exceeding a threshold, the location server 160 may then determine to use TRS as a QCL reference.

At block 820, the location server can then determine the PRS to use as the QCL reference. That is, the location server 160 may identify a particular TRS (e.g., a P-TRS or AP-TRS) to use as a QCL reference, and configure a DL-PRS accordingly (e.g., having the time/frequency constraints as previously described). Because TRS may be configured by the TRP 320, the location server may optionally request the TRS configuration, as indicated at arrow 825. In response, the TRP 320 can provide the TRS configuration, indicated at arrow 830.

The location server 160 can then include the TRS to be used as a QCL reference for the DL-PRS in a PRS configuration, which it can send to the UE 105 as indicated at arrow 835. The PRS configuration may further indicate a QCL type (e.g., QCL-TypeC), along with other information regarding the DL-PRS resource to be transmitted by the TRP 320 (e.g., PRS frequency, comb type, periodicity, etc.).

At block 840, the functionality comprises conducting position measurements between the TRP 320 and UE 105. This can involve the transmission of the DL-PRS by the TRP 320, and corresponding measurements by the UE 105, which can be made in accordance with traditional positioning techniques. According to some embodiments, however, the PRS measurement window and/or periodicity may be dynamically adjusted based on UE mobility, as previously described. Moreover, in cases where the UE 105 transmits one or more UL reference signals (e.g., SRS) for measurement by the TRP 320, embodiments may provide for the location server 160 providing a velocity report of the UE to one or more TRPs in the manner previously described. This functionality is illustrated in FIG. 10, which is described in further detail below.

FIG. 9 is a diagram illustrating variation to the method of coordinating transmission of a DL-PRS resource illustrated in FIG. 8, according to an embodiment. Here, the functions 905-940 performed by the location server 160, TRP 320, and UE 105 may echo corresponding functions 805-840 of FIG. 8 as previously described. Here, however, rather than the location server 160 determining a DL-PRS configuration based on a TRS configuration provided by the TRP 320, the location server 160 may provide DL-PRS information to the TRP, as indicated at arrow 920, and allow the TRP 320 to determine the TRS to use as the QCL reference. The TRP 320 can then send information indicative of the TRS to the location server 160, as indicated at arrow 925. According to some embodiments, the decision whether to perform the functionality in FIG. 8 or perform the functionality in FIG. 9 may be made by the location server and may be based at least in part on the capabilities of the TRP 320.

FIG. 10 is a diagram illustrating how a location server may be used to provide a velocity report to one or more TRPs 320, as previously noted, according to some embodiments. Again, operations 1005-1040 may be similar to corresponding operations 805-840 of FIG. 8. It can be noted that, although other operations are omitted in FIG. 10, they may be included, depending on desired functionality. Here, however, in response to receiving the indication of the velocity at block 1010, the location server can then provide a velocity report for SRS processing to one or more TRPs, as indicated at arrow 1020, prior to conducting the positioning measurements at block 1040. The velocity report may include the velocity-related information, as previously described, enabling the one or more TRPs to adjust the respective searching window for SRS reception and processing accordingly. Thus, the additional functionality illustrated by arrow 1020 can be included in embodiments (e.g., as shown in FIGS. 8 and/or 9) in positioning sessions in which the UE 105 is configured to transmit SRS resources to be measured by the one or more TRPs.

Figure 11:
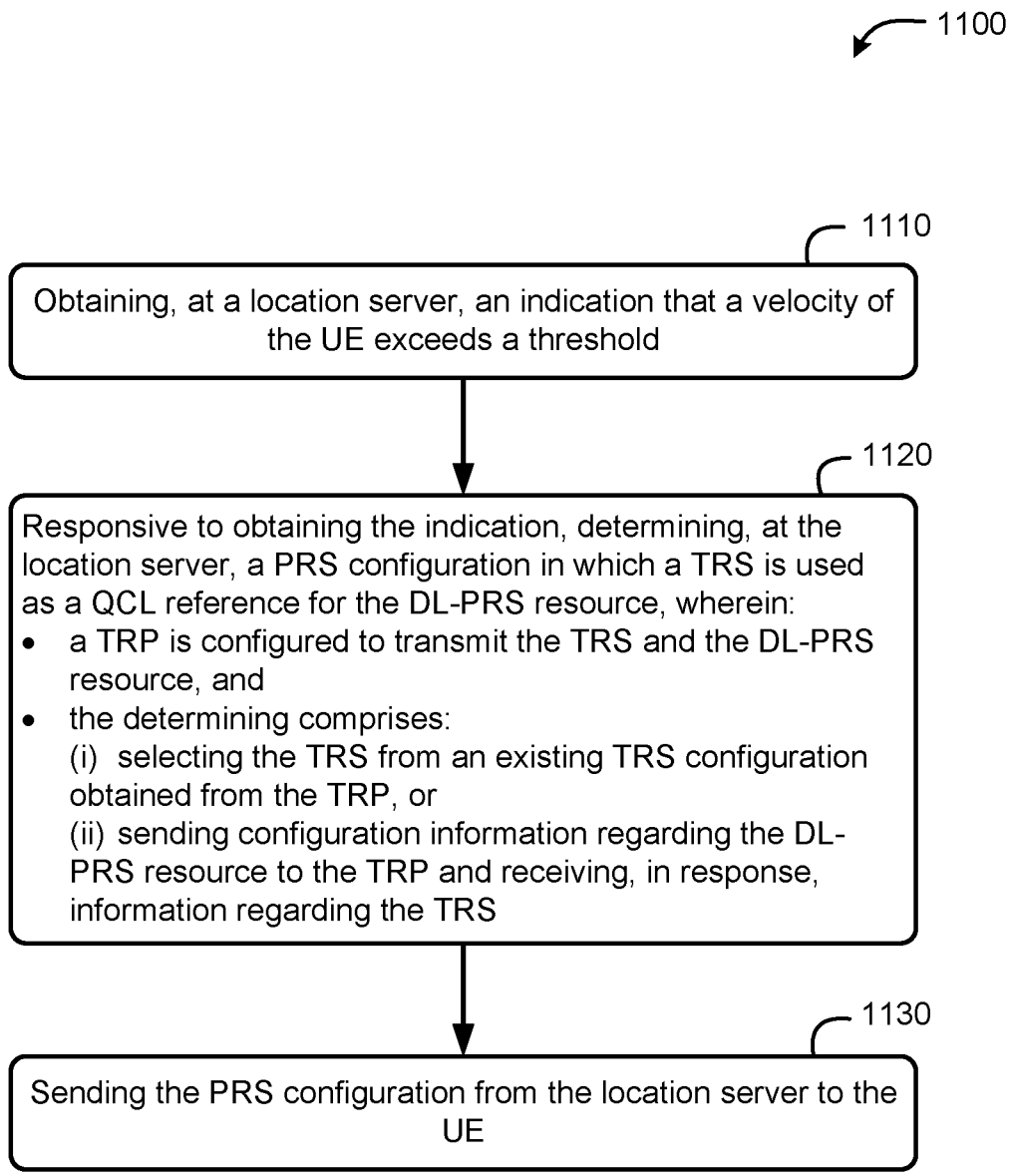
FIG. 11 is a flow diagram of a method of coordinating transmission of a DL-PRS resource for positioning a UE, according to an embodiment.
Figure 14:
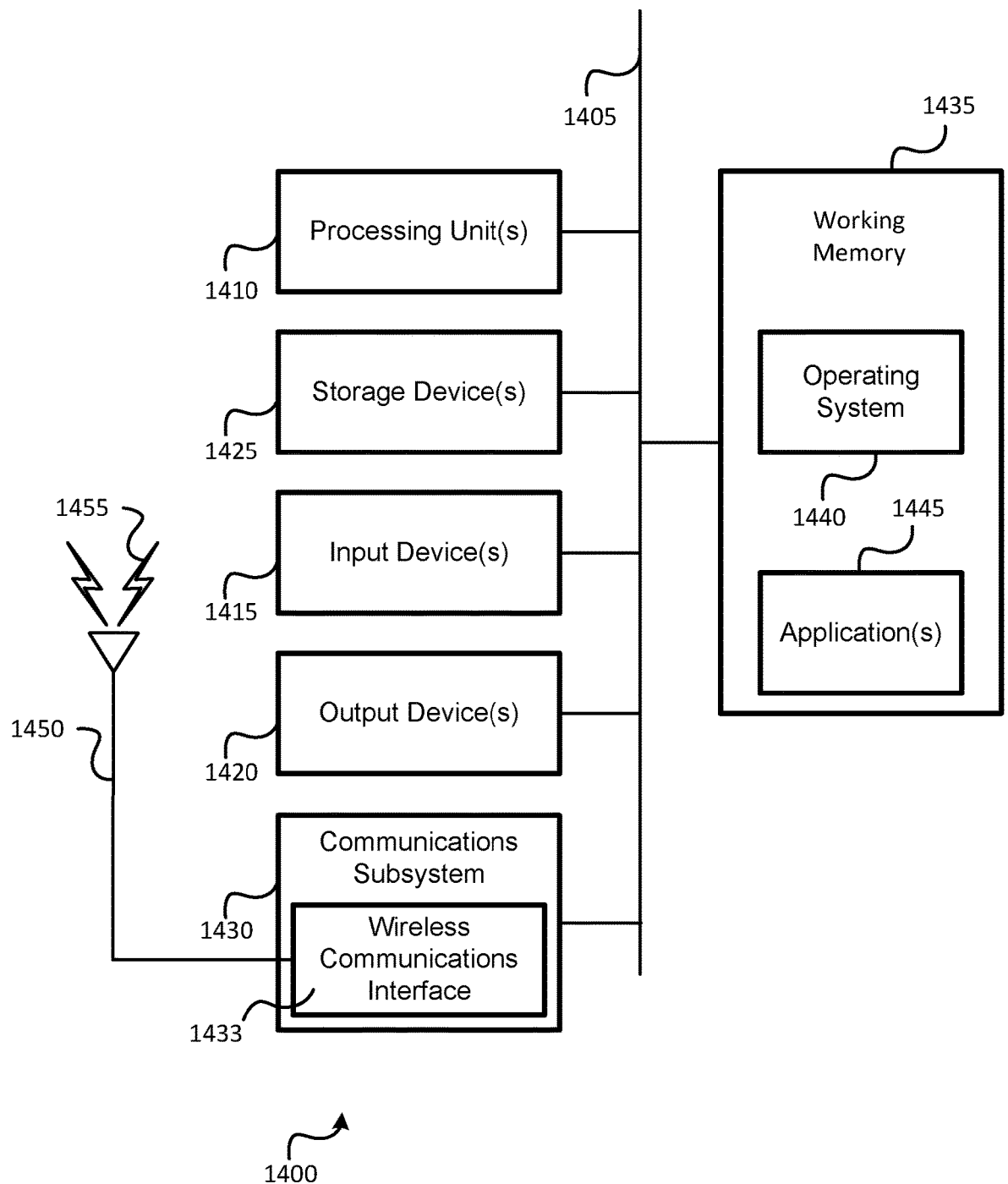
FIG. 14 is a block diagram of an embodiment of a computer system, which can be utilized in embodiments as described herein.

FIG. 11 is a flow diagram of a method 1100 of coordinating transmission of a DL-PRS resource for positioning a UE, according to an embodiment. Means for performing the functionality illustrated in one or more of the blocks shown in FIG. 11 may be performed by hardware and/or software components of a location server, for example. Example components of a location server are illustrated in FIGS. 14, which it is described in more detail below.

At block 1110, the functionality comprises obtaining, at a location server, an indication that a velocity of the UE exceeds a threshold. As previously noted with regard to FIGS. 8-10, this may be done by the location server, at least in part, by receiving velocity information from the UE and comparing it against a threshold. As such, according to some alternative embodiments of the method 1100, obtaining the indication that the velocity of the UE exceeds a threshold may comprise receiving information indicative of the velocity from the UE. Further, as previously noted, the method 1100 may be performed during a positioning session between the UE and the location server, in which case the method may further comprise sending, from the location server, a velocity report to the TRP and one or more additional TRPs configured to transmit reference signals during the positioning session, wherein the velocity report comprises velocity information of the UE. This velocity report may further comprise, in some embodiments, an ID of the UE, a time stamp, a source of the velocity information, or an uncertainty regarding the velocity of the UE, or a combination thereof. Alternative embodiments may use additional or alternative means for obtaining the UEs velocity. Moreover, as previously indicated, the threshold may vary, depending on the frequency used (or expected to be used) for the DL-PRS, accuracy requirements for the positioning of the UE, etc. Means for performing functionality at block 1110 may comprise a processing unit 1410, storage device 1425, working memory 1435, communications subsystem 1430 and/or other components of a location server as illustrated in FIG. 14.

At block 1120, the functionality comprises, responsive to obtaining the indication, determining, at the location server, a PRS configuration in which a TRS is used as a QCL reference for the DL-PRS resource. A TRP is configured to transmit the TRS and the DL-PRS resource, and the determining comprises (i) selecting the TRS from an existing TRS configuration obtained from the TRP, or (ii) sending configuration information regarding the DL-PRS resource to the TRP and receiving, in response, information regarding the TRS. According to some embodiments, TRS may comprise a QCL-TypeC reference. Additionally or alternatively, the TRS may comprise a periodic TRS (P-TRS) or an aperiodic TRS (AP-TRS). Means for performing functionality at block 1120 may comprise a processing unit 1410, storage device 1425, working memory 1435, communications subsystem 1430 and/or other components of a location server as illustrated in FIG. 14.

At block 1130, the functionality comprises sending the PRS configuration from the location server to the UE. As noted, the PRS configuration may indicate the TRS is to be used as a QCL reference for the DL-PRS resource. The PRS configuration may additionally include a configuration for additional DL-PRS resources transmitted by the TRP and/or one or more additional TRPs. The PRS configuration may further include information to enable the UE to measure and process the DL-PRS, such as timing, frequency, and/or other related information. Means for performing functionality at block 1130 may comprise a processing unit 1410, storage device 1425, working memory 1435, communications subsystem 1430 and/or other components of a location server as illustrated in FIG. 14

As noted in the embodiments previously described, alternative embodiments may include additional functionality. For example, according to some embodiments, the TRP may comprise a serving TRP of the UE. Alternatively, the TRP may comprise a neighboring TRP of the UE, and the method may further comprise sending information regarding transmission of the TRS from the location server to the UE (e.g., in the manner previously described with regard to FIG. 10). Additionally or alternatively, the TRS may be used as an indirect QCL reference for the DL-PRS resource, wherein the TRS comprises a QCL reference for a Synchronization Signal Block (SSB) transmitted by the TRP, and the SSB comprises a QCL reference DL-PRS resource.

As noted, aspects of the PRS configuration and/or PRS measurement period may be configured dynamically. According to some embodiments, the PRS configuration may comprise a PRS measurement period dynamically configured by the TRP. Additionally or alternatively, alternative embodiments may further comprise determining a PRS measurement period to include in the PRS configuration, wherein determining the PRS measurement period is based, at least in part, on a preferred PRS measurement period received from the UE. According to some embodiments, the method 1100 may further comprise determining a suggested PRS measurement period based on an estimate of the velocity of the UE, sending the suggested PRS measurement period to the UE, and in response to sending the suggested PRS measurement period to the UE, receiving a PRS measurement period from the UE.

Figure 12:
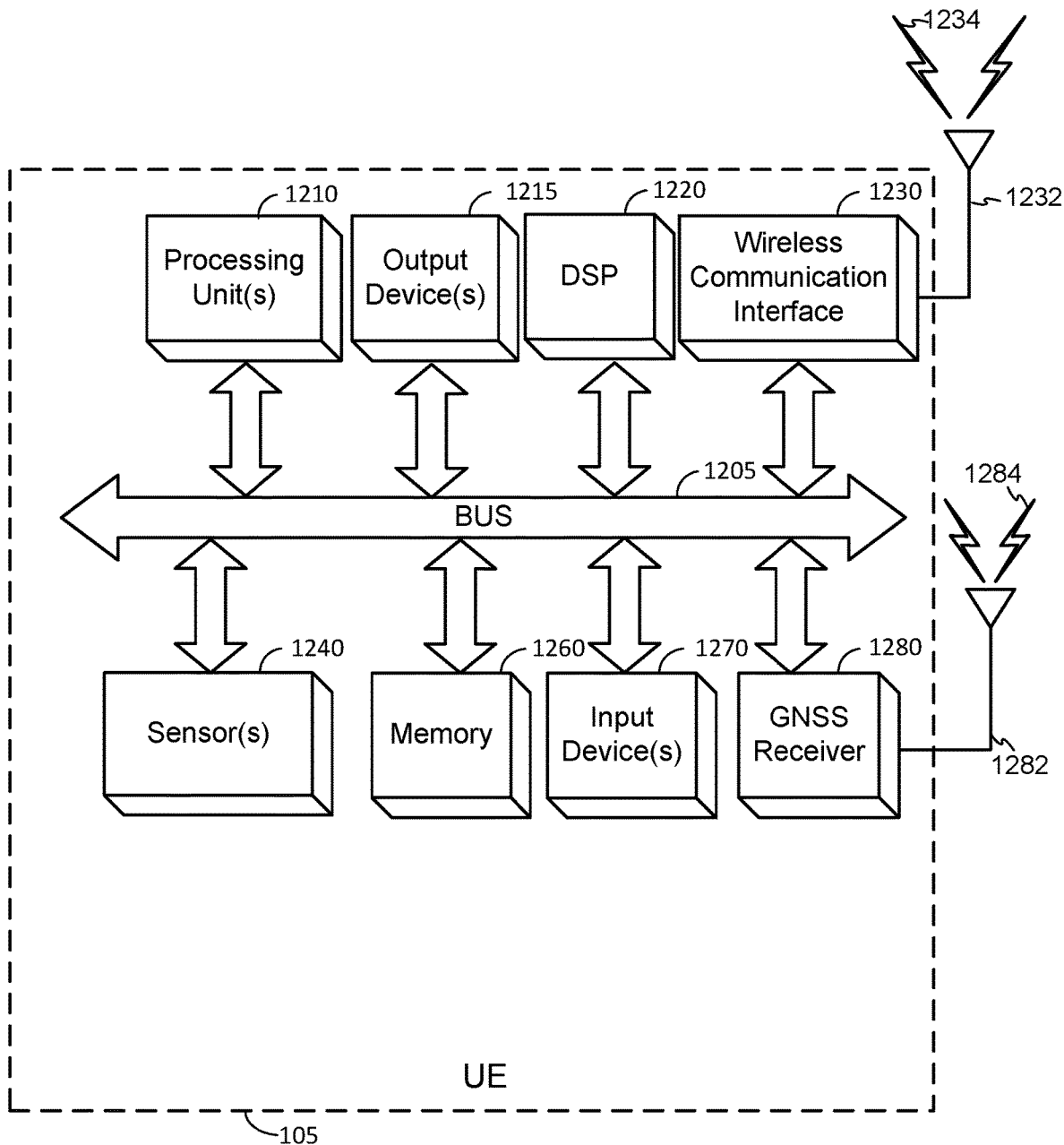
FIG. 12 is a block diagram of an embodiment of a UE, which can be utilized in embodiments as described herein.

FIG. 12 illustrates an embodiment of a UE 105, which can be utilized as described herein above (e.g., in association with FIGS. 1-11). For example, the UE 105 can perform one or more of the functions of the call flow diagrams illustrated in FIGS. 8-10. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations (e.g., different locations on a vehicle). Furthermore, as previously noted, the functionality of the UE discussed in the previously described embodiments may be executed by one or more of the hardware and/or software components illustrated in FIG. 12.

The UE 105 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below). The UE 105 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The UE 105 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1230 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1210, DSP 1220, and/or a processing unit within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1210 or DSP 1220.

The UE 105 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the UE 105 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the UE 105 (and/or processing unit(s) 1210 or DSP 1220 within UE 105). In some embodiments, then, such code and/or instructions can be used to configure and/or adapt a general-purpose computer (or other device) to perform one or more operations in accordance with the described methods.

Figure 13:
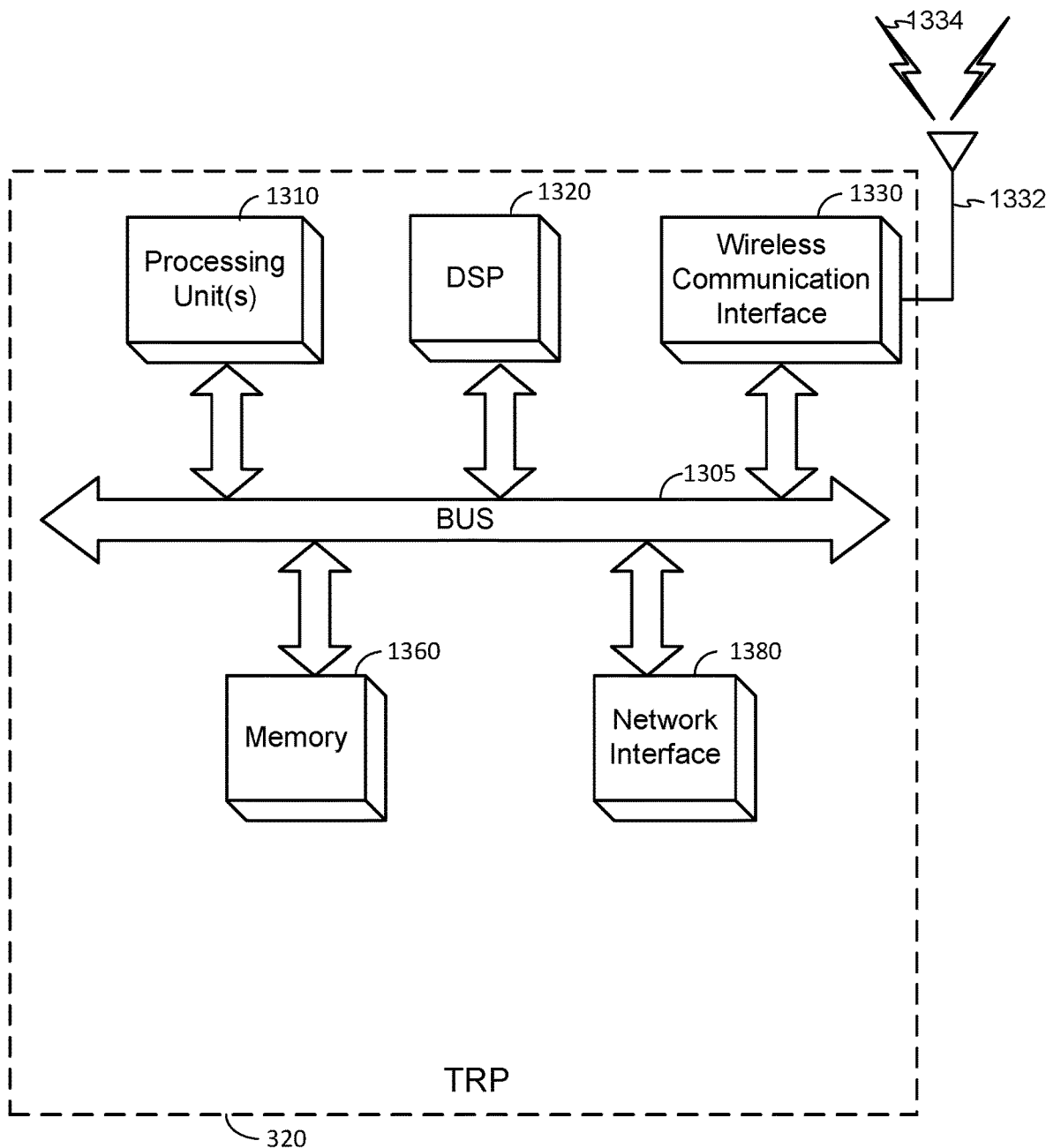
FIG. 13 is a block diagram of an embodiment of a TRP, which can be utilized in embodiments as described herein.

FIG. 13 illustrates an embodiment of a TRP 320, which can be utilized as described herein above (e.g., in association with FIGS. 1-12). It should be noted that FIG. 13 is meant only to provide a generalized illustration of various components, any or all of which may be utilized as appropriate. In some embodiments, the TRP 320 may correspond to a gNB, an ng-cNB, and/or (more generally) any type of base station.

The TRP 320 is shown comprising hardware elements that can be electrically coupled via a bus 1305 (or may otherwise be in communication, as appropriate). The hardware elements may include a processing unit(s) 1310 which can include without limitation one or more general-purpose processors, one or more special-purpose processors (such as DSP chips, graphics acceleration processors, ASICs, and/or the like), and/or other processing structure or means. As shown in FIG. 13, some embodiments may have a separate DSP 1320, depending on desired functionality. Location determination and/or other determinations based on wireless communication may be provided in the processing unit(s) 1310 and/or wireless communication interface 1330 (discussed below), according to some embodiments. The TRP 320 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 320 might also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 320 to communicate as described herein. The wireless communication interface 1330 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1332 that send and/or receive wireless signals 1334.

The TRP 320 may also include a network interface 1380, which can include support of wireline communication technologies. The network interface 1380 may include a modem, network card, chipset, and/or the like. The network interface 1380 may include one or more input and/or output communication interfaces to permit data to be exchanged with a network, communication network servers, computer systems, and/or any other electronic devices described herein.

In many embodiments, the TRP 320 may further comprise a memory 1360. The memory 1360 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1360 of the TRP 320 also may comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the TRP 320 (and/or processing unit(s) 1310 or DSP 1320 within TRP 320). In some embodiments, then, such code and/or instructions can be used to configure and/or adapt a general-purpose computer (or other device) to perform one or more operations in accordance with the described methods.

FIG. 14 is a block diagram of an embodiment of a computer system 1400, which may be used, in whole or in part, to provide the functions of one or more network components as described in the embodiments herein (e.g., location server 160 of FIGS. 1 and 8-10). It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner. In addition, it can be noted that components illustrated by FIG. 14 can be localized to a single device and/or distributed among various networked devices, which may be disposed at different geographical locations.

The computer system 1400 is shown comprising hardware elements that can be electrically coupled via a bus 1405 (or may otherwise be in communication, as appropriate). The hardware elements may include processing unit(s) 1410, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1400 also may comprise one or more input devices 1415, which may comprise without limitation a mouse, a keyboard, a camera, a microphone, and/or the like; and one or more output devices 1420, which may comprise without limitation a display device, a printer, and/or the like.

The computer system 1400 may further include (and/or be in communication with) one or more non-transitory storage devices 1425, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1400 may also include a communications subsystem 1430, which may comprise wireless communication technologies managed and controlled by a wireless communication interface 1433, as well as wired technologies (such as Ethernet, coaxial communications, universal serial bus (USB), and the like). The wireless communication interface 1433 may comprise one or more wireless transceivers may send and receive wireless signals 1455 (e.g., signals according to 5G NR or LTE) via wireless antenna(s) 1450. Thus the communications subsystem 1430 may comprise a modem, a network card (wireless or wired), an infrared communication device, a wireless communication device, and/or a chipset, and/or the like, which may enable the computer system 1400 to communicate on any or all of the communication networks described herein to any device on the respective network, including a User Equipment (UE), base stations and/or other TRPs, and/or any other electronic devices described herein. Hence, the communications subsystem 1430 may be used to receive and send data as described in the embodiments herein.

In many embodiments, the computer system 1400 will further comprise a working memory 1435, which may comprise a RAM or ROM device, as described above. Software elements, shown as being located within the working memory 1435, may comprise an operating system 1440, device drivers, executable libraries, and/or other code, such as one or more applications 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of coordinating transmission of a downlink Positioning Reference Signal (DL-PRS) resource for positioning a User Equipment (UE) in a wireless communication network, the method comprising: obtaining, at a location server, an indication that a velocity of the UE exceeds a threshold; responsive to obtaining the indication, determining, at the location server, a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS; and sending the PRS configuration from the location server to the UE.

Clause 2. The method of clause 1, wherein the TRP comprises a serving TRP of the UE.

Clause 3. The method of clause 1 wherein the TRP comprises a neighboring TRP of the UE, and wherein the method further comprises sending information regarding transmission of the TRS from the location server to the UE.

Clause 4. The method of any of clauses 1-3 wherein the TRS is used as an indirect QCL reference for the DL-PRS resource, wherein the TRS comprises a QCL reference for a Synchronization Signal Block (SSB) transmitted by the TRP, and the SSB comprises a QCL reference DL-PRS resource.

Clause 5. The method of any of clauses 1-4 wherein the TRS comprises a QCL-TypeC reference.

Clause 6. The method of any of clauses 1-5 wherein the TRS comprises a periodic TRS (P-TRS) or an aperiodic TRS (AP-TRS).

Clause 7. The method of any of clauses 1-6 wherein obtaining the indication that the velocity of the UE exceeds a threshold comprises receiving information indicative of the velocity from the UE.

Clause 8. The method of any of clauses 1-7 wherein the method is performed during a positioning session between the UE and the location server, the method further comprising sending, from the location server, a velocity report to the TRP and one or more additional TRPs configured to transmit reference signals during the positioning session, wherein the velocity report comprises velocity information of the UE.

Clause 9. The method of clause 8 wherein the velocity report further comprises: an identifier (ID) of the UE, a time stamp, a source of the velocity information, or an uncertainty regarding the velocity of the UE, or a combination thereof.

Clause 10. The method of any of clauses 1-9 wherein the PRS configuration comprises a PRS measurement period dynamically configured by the TRP.

Clause 11. The method of any of clauses 1-10 further comprising determining a PRS measurement period to include in the PRS configuration, wherein determining the PRS measurement period is based, at least in part, on a preferred PRS measurement period received from the UE.

Clause 12. The method of any of clauses 1-9 further comprising determining a suggested PRS measurement period based on an estimate of the velocity of the UE; sending the suggested PRS measurement period to the UE; and in response to sending the suggested PRS measurement period to the UE, receiving a PRS measurement period from the UE.

Clause 13. A location server for coordinating transmission of a downlink Positioning Reference Signal (DL-PRS) resource for positioning a User Equipment (UE) in a wireless communication network, the location server comprising: a transceiver; a memory; and one or more processors communicatively coupled with the transceiver and the memory, wherein the one or more processors are configured to: obtain an indication that a velocity of the UE exceeds a threshold; responsive to obtaining the indication, determine a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS; and send, via the transceiver, the PRS configuration to the UE.

Clause 14. The location server of clause 13, wherein, to determine the PRS configuration, the one or more processors are further configured to determine the PRS configuration in which the TRP comprises a serving TRP of the UE.

Clause 15. The location server of any of clause 13 wherein, to determine the PRS configuration, the one or more processors are further configured to determine the PRS configuration in which the TRP comprises a neighboring TRP of the UE, and wherein the one or more processors are further configured to send information regarding transmission of the TRS to the UE via the transceiver.

Clause 16. The location server of any of clauses 13-15 wherein, to determine the PRS configuration, the one or more processors are configured to use the TRS as an indirect QCL reference for the DL-PRS resource, wherein the TRS comprises a QCL reference for a Synchronization Signal Block (SSB) transmitted by the TRP, and the SSB comprises a QCL reference DL-PRS resource.

Clause 17. The location server of any of clauses 13-16 wherein the one or more processors are configured to use the TRS as a QCL-TypeC reference.

Clause 18. The location server of any of clauses 13-17 wherein the TRS comprises a periodic TRS (P-TRS) or an aperiodic TRS (AP-TRS).

Clause 19. The location server of any of clauses 13-18 wherein, to obtain the indication that the velocity of the UE exceeds a threshold, the one or more processors are configured to receive information indicative of the velocity from the UE.

Clause 20. The location server of any of clauses 13-19 wherein the one or more processors are configured to send the PRS configuration during a positioning session between the UE and the location server, and wherein the one or more processors are further configured to send, via the transceiver, a velocity report to the TRP and one or more additional TRPs configured to transmit reference signals during the positioning session, wherein the velocity report comprises velocity information of the UE.

Clause 21. The location server of clause 20 wherein the one or more processors are further configured to include, in the velocity report: an identifier (ID) of the UE, a time stamp, a source of the velocity information, or an uncertainty regarding the velocity of the UE, or a combination thereof.

Clause 22. The location server of any of clauses 13-21 wherein the one or more processors are further configured to include, in the PRS configuration, a PRS measurement period dynamically configured by the TRP.

Clause 23. The location server of any of clauses 13-22 wherein the one or more processors are further configured to determine a PRS measurement period to include in the PRS configuration, wherein determining the PRS measurement period is based, at least in part, on a preferred PRS measurement period received from the UE.

Clause 24. The location server of any of clauses 13-21 wherein the one or more processors are further configured to: determine a suggested PRS measurement period based on an estimate of the velocity of the UE; send the suggested PRS measurement period to the UE; and receive a PRS measurement period from the UE.

Clause 25. An apparatus for coordinating transmission of a downlink Positioning Reference Signal (DL-PRS) resource for positioning a User Equipment (UE) in a wireless communication network, the apparatus comprising: means for obtaining an indication that a velocity of the UE exceeds a threshold; means for determining, responsive to obtaining the indication, a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS; and means for sending the PRS configuration from a location server to the UE.

Clause 26. The apparatus of clause 25, wherein the means for determining the PRS configuration comprise means for determining the PRS configuration in which the TRP comprises a serving TRP of the UE.

Clause 27. The apparatus of any of clause 25 wherein the means for determining the PRS configuration comprise means for determining the PRS configuration in which the TRP comprises a neighboring TRP of the UE, and wherein the apparatus further comprises means for sending information regarding transmission of the TRS from the location server to the UE.

Clause 28. The apparatus of any of clauses 25-27 wherein the means for obtaining the indication that the velocity of the UE exceeds a threshold comprises means for receiving information indicative of the velocity from the UE.

Clause 29. The apparatus of any of clauses 25-28 further comprising means for sending the PRS configuration during a positioning session between the UE and the location server, and means for sending a velocity report to the TRP and one or more additional TRPs configured to transmit reference signals during the positioning session, wherein the velocity report comprises velocity information of the UE.

Clause 30. The apparatus of clause 29 wherein the means for sending the velocity report includes means for including, in the velocity report: an identifier (ID) of the UE, a time stamp, a source of the velocity information, or an uncertainty regarding the velocity of the UE, or a combination thereof.

Clause 31. The apparatus of any of clauses 25-30 further comprising means for determining a PRS measurement period to include in the PRS configuration, wherein determining the PRS measurement period is based, at least in part, on a preferred PRS measurement period received from the UE.

Clause 32. The apparatus of any of clauses 25-30 further comprising means for determining a suggested PRS measurement period based on an estimate of the velocity of the UE; means for sending the suggested PRS measurement period to the UE; and in response to sending the suggested PRS measurement period to the UE, means for receiving a PRS measurement period from the UE.

Clause 33. A non-transitory computer-readable medium storing instructions for coordinating transmission of a downlink Positioning Reference Signal (DL-PRS) resource for positioning a User Equipment (UE) in a wireless communication network, the instructions comprising code for: obtaining an indication that a velocity of the UE exceeds a threshold; responsive to obtaining the indication, determining a PRS configuration in which a Tracking Reference Signal (TRS) is used as a Quasi-Collocation (QCL) reference for the DL-PRS resource, wherein: a Transmission Reception Point (TRP) is configured to transmit the TRS and the DL-PRS resource, and the determining comprises: (i) selecting the TRS from an existing TRS configuration obtained from the TRP, or (ii) sending configuration information regarding the DL-PRS resource to the TRP and receiving, in response, information regarding the TRS; and sending the PRS configuration from a location server to the UE.

Clause 34. The computer-readable medium of clause 33, wherein the code for determining the PRS configuration includes code for determining the PRS configuration such that the TRP comprises a serving TRP of the UE.

Clause 35. The computer-readable medium of clause 34 wherein the code for determining the PRS configuration includes code for determining the PRS configuration such that TRP comprises a neighboring TRP of the UE, and wherein the instructions further comprise code for sending information regarding transmission of the TRS from the location server to the UE.

Clause 36. The computer-readable medium of any of clauses 33-35 wherein the instructions further comprise code for using the TRS as an indirect QCL reference for the DL-PRS resource, wherein the TRS comprises a QCL reference for a Synchronization Signal Block (SSB) transmitted by the TRP, and the SSB comprises a QCL reference DL-PRS resource.

Clause 37. The computer-readable medium of any of clauses 33-36 wherein the code for obtaining the indication that the velocity of the UE exceeds a threshold comprises code for receiving information indicative of the velocity from the UE.

Clause 38. The computer-readable medium of any of clauses 33-37 wherein the code for determining the PRS configuration comprises code for determining the PRS configuration in which a PRS measurement period is dynamically configured by the TRP.

Clause 39. The computer-readable medium of any of clauses 33-38 wherein the instructions further comprise code for determining a PRS measurement period such that the PRS measurement period includes in the PRS configuration, wherein determining the PRS measurement period is based, at least in part, on a preferred PRS measurement period received from the UE.

Clause 40. The computer-readable medium of any of clauses 33-38 wherein the instructions further comprise code for: determining a suggested PRS measurement period based on an estimate of the velocity of the UE; sending the suggested PRS measurement period to the UE; and in response to sending the suggested PRS measurement period to the UE, receiving a PRS measurement period from the UE.

What is claimed is:

1. A method of coordinating transmission of a downlink Positioning Reference Signal (DL-PRS) resource for positioning a User Equipment (UE) in a wireless communication network, the method comprising:
obtaining, at a location server, an indication that a velocity of the UE exceeds a threshold;
responsive to obtaining the indication, determining, at the location server, a PRS configuration in which a Tracking Reference Signal (TRS) is used as a Quasi-Collocation (QCL) reference for the DL-PRS resource, wherein:
a Transmission Reception Point (TRP) is configured to transmit the TRS and the DL-PRS resource, and
the determining comprises: (i) selecting the TRS from an existing TRS configuration obtained from the TRP, or (ii) sending configuration information regarding the DL-PRS resource to the TRP and receiving, in response, information regarding the TRS; and
sending the PRS configuration from the location server to the UE.

2. The method of claim 1, wherein the TRP comprises a serving TRP of the UE.

3. The method of claim 1, wherein the TRP comprises a neighboring TRP of the UE, and wherein the method further comprises sending information regarding transmission of the TRS from the location server to the UE.

4. The method of claim 1, wherein the TRS is used as an indirect QCL reference for the DL-PRS resource, wherein the TRS comprises a QCL reference for a Synchronization Signal Block (SSB) transmitted by the TRP, and the SSB comprises a QCL reference DL-PRS resource.

5. The method of claim 1, wherein the TRS comprises a QCL-TypeC reference.

6. The method of claim 1, wherein the TRS comprises a periodic TRS (P-TRS) or an aperiodic TRS (AP-TRS).

7. The method of claim 1, wherein obtaining the indication that the velocity of the UE exceeds a threshold comprises receiving information indicative of the velocity from the UE.

8. The method of claim 7, wherein the method is performed during a positioning session between the UE and the location server, the method further comprising sending, from the location server, a velocity report to the TRP and one or more additional TRPs configured to transmit reference signals during the positioning session, wherein the velocity report comprises velocity information of the UE.

9. The method of claim 8, wherein the velocity report further comprises:
an identifier (ID) of the UE,
a time stamp,
a source of the velocity information, or
an uncertainty regarding the velocity of the UE, or
a combination thereof.

10. The method of claim 1, wherein the PRS configuration comprises a PRS measurement period dynamically configured by the TRP.

11. The method of claim 1, further comprising determining a PRS measurement period to include in the PRS configuration, wherein determining the PRS measurement period is based, at least in part, on a preferred PRS measurement period received from the UE.

12. The method of claim 1, further comprising:
determining a suggested PRS measurement period based on an estimate of the velocity of the UE;
sending the suggested PRS measurement period to the UE; and
in response to sending the suggested PRS measurement period to the UE, receiving a PRS measurement period from the UE.

13. A location server for coordinating transmission of a downlink Positioning Reference Signal (DL-PRS) resource for positioning a User Equipment (UE) in a wireless communication network, the location server comprising:
a transceiver;
a memory; and
one or more processors communicatively coupled with the transceiver and the memory, wherein the one or more processors are configured to:
obtain an indication that a velocity of the UE exceeds a threshold;
responsive to obtaining the indication, determine a PRS configuration in which a Tracking Reference Signal (TRS) is used as a Quasi-Collocation (QCL) reference for the DL-PRS resource, wherein:
a Transmission Reception Point (TRP) is configured to transmit the TRS and the DL-PRS resource, and
the determining comprises: (i) selecting the TRS from an existing TRS configuration obtained from the TRP, or (ii) sending configuration information regarding the DL-PRS resource to the TRP and receiving, in response, information regarding the TRS; and
send, via the transceiver, the PRS configuration to the UE.

14. The location server of claim 13, wherein, to determine the PRS configuration, the one or more processors are further configured to determine the PRS configuration in which the TRP comprises a serving TRP of the UE.

15. The location server of claim 13, wherein, to determine the PRS configuration, the one or more processors are further configured to determine the PRS configuration in which the TRP comprises a neighboring TRP of the UE, and wherein the one or more processors are further configured to send information regarding transmission of the TRS to the UE via the transceiver.

16. The location server of claim 13, wherein, to determine the PRS configuration, the one or more processors are configured to use the TRS as an indirect QCL reference for the DL-PRS resource, wherein the TRS comprises a QCL reference for a Synchronization Signal Block (SSB) transmitted by the TRP, and the SSB comprises a QCL reference DL-PRS resource.

17. The location server of claim 13, wherein the one or more processors are configured to use the TRS as a QCL-TypeC reference.

18. The location server of claim 13, wherein the TRS comprises a periodic TRS (P-TRS) or an aperiodic TRS (AP-TRS).

19. The location server of claim 13, wherein, to obtain the indication that the velocity of the UE exceeds a threshold, the one or more processors are configured to receive information indicative of the velocity from the UE.

20. The location server of claim 19, wherein the one or more processors are configured to send the PRS configuration during a positioning session between the UE and the location server, and wherein the one or more processors are further configured to send, via the transceiver, a velocity report to the TRP and one or more additional TRPs configured to transmit reference signals during the positioning session, wherein the velocity report comprises velocity information of the UE.

21. The location server of claim 20, wherein the one or more processors are further configured to include, in the velocity report:
an identifier (ID) of the UE,
a time stamp,
a source of the velocity information, or
an uncertainty regarding the velocity of the UE, or
a combination thereof.

22. The location server of claim 13, wherein the one or more processors are further configured to include, in the PRS configuration, a PRS measurement period dynamically configured by the TRP.

23. The location server of claim 13, wherein the one or more processors are further configured to determine a PRS measurement period to include in the PRS configuration, wherein determining the PRS measurement period is based, at least in part, on a preferred PRS measurement period received from the UE.

24. The location server of claim 13, wherein the one or more processors are further configured to:
determine a suggested PRS measurement period based on an estimate of the velocity of the UE;
send the suggested PRS measurement period to the UE; and
receive a PRS measurement period from the UE.

25. An apparatus for coordinating transmission of a downlink Positioning Reference Signal (DL-PRS) resource for positioning a User Equipment (UE) in a wireless communication network, the apparatus comprising:
means for obtaining an indication that a velocity of the UE exceeds a threshold;
means for determining, responsive to obtaining the indication, a PRS configuration in which a Tracking Reference Signal (TRS) is used as a Quasi-Collocation (QCL) reference for the DL-PRS resource, wherein:
a Transmission Reception Point (TRP) is configured to transmit the TRS and the DL-PRS resource, and
the determining comprises: (i) selecting the TRS from an existing TRS configuration obtained from the TRP, or (ii) sending configuration information regarding the DL-PRS resource to the TRP and receiving, in response, information regarding the TRS; and
means for sending the PRS configuration from a location server to the UE.

26. The apparatus of claim 25, wherein the means for determining the PRS configuration comprise means for determining the PRS configuration in which the TRP comprises a serving TRP of the UE.

27. The apparatus of claim 25, wherein the means for determining the PRS configuration comprise means for determining the PRS configuration in which the TRP comprises a neighboring TRP of the UE, and wherein the apparatus further comprises means for sending information regarding transmission of the TRS from the location server to the UE.

28. The apparatus of claim 25, wherein the means for obtaining the indication that the velocity of the UE exceeds a threshold comprises means for receiving information indicative of the velocity from the UE.

29. The apparatus of claim 28, further comprising:
means for sending the PRS configuration during a positioning session between the UE and the location server, and
means for sending a velocity report to the TRP and one or more additional TRPs configured to transmit reference signals during the positioning session, wherein the velocity report comprises velocity information of the UE.

30. The apparatus of claim 29, wherein the means for sending the velocity report includes means for including, in the velocity report:
an identifier (ID) of the UE,
a time stamp,
a source of the velocity information, or
an uncertainty regarding the velocity of the UE, or
a combination thereof.

31. The apparatus of claim 25, further comprising means for determining a PRS measurement period to include in the PRS configuration, wherein determining the PRS measurement period is based, at least in part, on a preferred PRS measurement period received from the UE.

32. The apparatus of claim 25, further comprising:
means for determining a suggested PRS measurement period based on an estimate of the velocity of the UE;
means for sending the suggested PRS measurement period to the UE; and
in response to sending the suggested PRS measurement period to the UE, means for receiving a PRS measurement period from the UE.

33. A non-transitory computer-readable medium storing instructions for coordinating transmission of a downlink Positioning Reference Signal (DL-PRS) resource for positioning a User Equipment (UE) in a wireless communication network, the instructions comprising code for:
obtaining an indication that a velocity of the UE exceeds a threshold;
responsive to obtaining the indication, determining a PRS configuration in which a Tracking Reference Signal (TRS) is used as a Quasi-Collocation (QCL) reference for the DL-PRS resource, wherein:
a Transmission Reception Point (TRP) is configured to transmit the TRS and the DL-PRS resource, and
the determining comprises: (i) selecting the TRS from an existing TRS configuration obtained from the TRP, or (ii) sending configuration information regarding the DL-PRS resource to the TRP and receiving, in response, information regarding the TRS; and
sending the PRS configuration from a location server to the UE.

34. The computer-readable medium of claim 33, wherein the code for determining the PRS configuration includes code for determining the PRS configuration such that the TRP comprises a serving TRP of the UE.

35. The computer-readable medium of claim 33, wherein the code for determining the PRS configuration includes code for determining the PRS configuration such that TRP comprises a neighboring TRP of the UE, and wherein the instructions further comprise code for sending information regarding transmission of the TRS from the location server to the UE.

36. The computer-readable medium of claim 33, wherein the instructions further comprise code for using the TRS as an indirect QCL reference for the DL-PRS resource, wherein the TRS comprises a QCL reference for a Synchronization Signal Block (SSB) transmitted by the TRP, and the SSB comprises a QCL reference DL-PRS resource.

37. The computer-readable medium of claim 33, wherein the code for obtaining the indication that the velocity of the UE exceeds a threshold comprises code for receiving information indicative of the velocity from the UE.

38. The computer-readable medium of claim 33, wherein the code for determining the PRS configuration comprises code for determining the PRS configuration in which a PRS measurement period is dynamically configured by the TRP.

39. The computer-readable medium of claim 33, wherein the instructions further comprise code for determining a PRS measurement period such that the PRS measurement period includes in the PRS configuration, wherein determining the PRS measurement period is based, at least in part, on a preferred PRS measurement period received from the UE.

40. The computer-readable medium of claim 33, wherein the instructions further comprise code for:
   determining a suggested PRS measurement period based on an estimate of the velocity of the UE;
   sending the suggested PRS measurement period to the UE; and
   in response to sending the suggested PRS measurement period to the UE, receiving a PRS measurement period from the UE.

* * * * *